Sept. 4, 1928.　　　　　　　　　　　　　　　　1,683,581
J. C. SHAW
ELECTRICAL OPERATION AND CONTROL OF MACHINE TOOLS
Filed March 4, 1924　　11 Sheets-Sheet 1
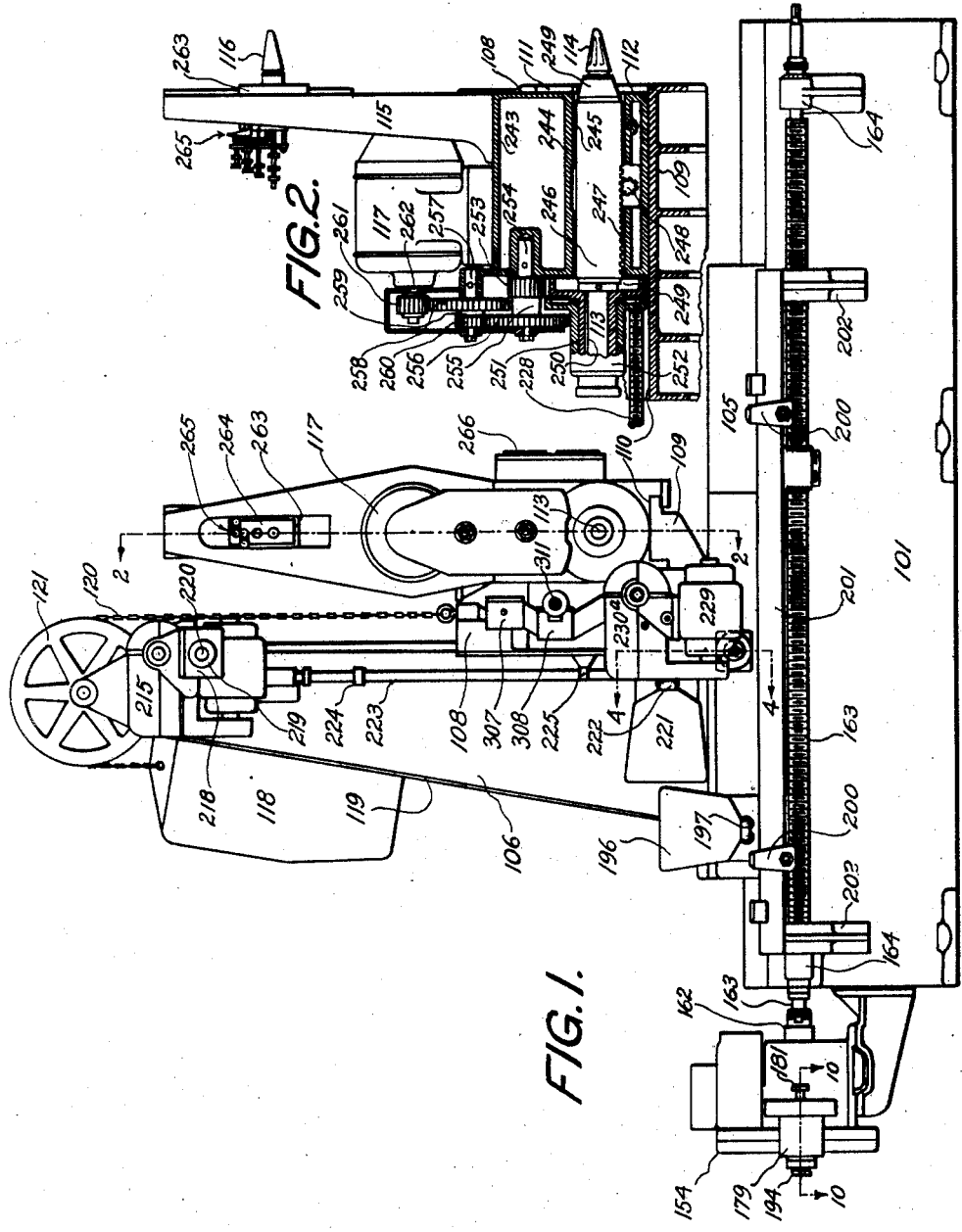
INVENTOR.
John C. Shaw.
BY
M. H. Lockwood
ATTORNEY.

Sept. 4, 1928.

J. C. SHAW 1,683,581

ELECTRICAL OPERATION AND CONTROL OF MACHINE TOOLS

Filed March 4, 1924  11 Sheets-Sheet 3

INVENTOR.
John C. Shaw
BY
ATTORNEY.

Sept. 4, 1928.  
J. C. SHAW  
1,683,581  
ELECTRICAL OPERATION AND CONTROL OF MACHINE TOOLS  
Filed March 4, 1924  11 Sheets-Sheet 4

INVENTOR.  
John C. Shaw  
BY  
M. H. Lockwood  
ATTORNEY.

Sept. 4, 1928.  
J. C. SHAW  
1,683,581

ELECTRICAL OPERATION AND CONTROL OF MACHINE TOOLS

Filed March 4, 1924    11 Sheets-Sheet 5

INVENTOR.
John C. Shaw
BY H. H. Lockwood
ATTORNEY.

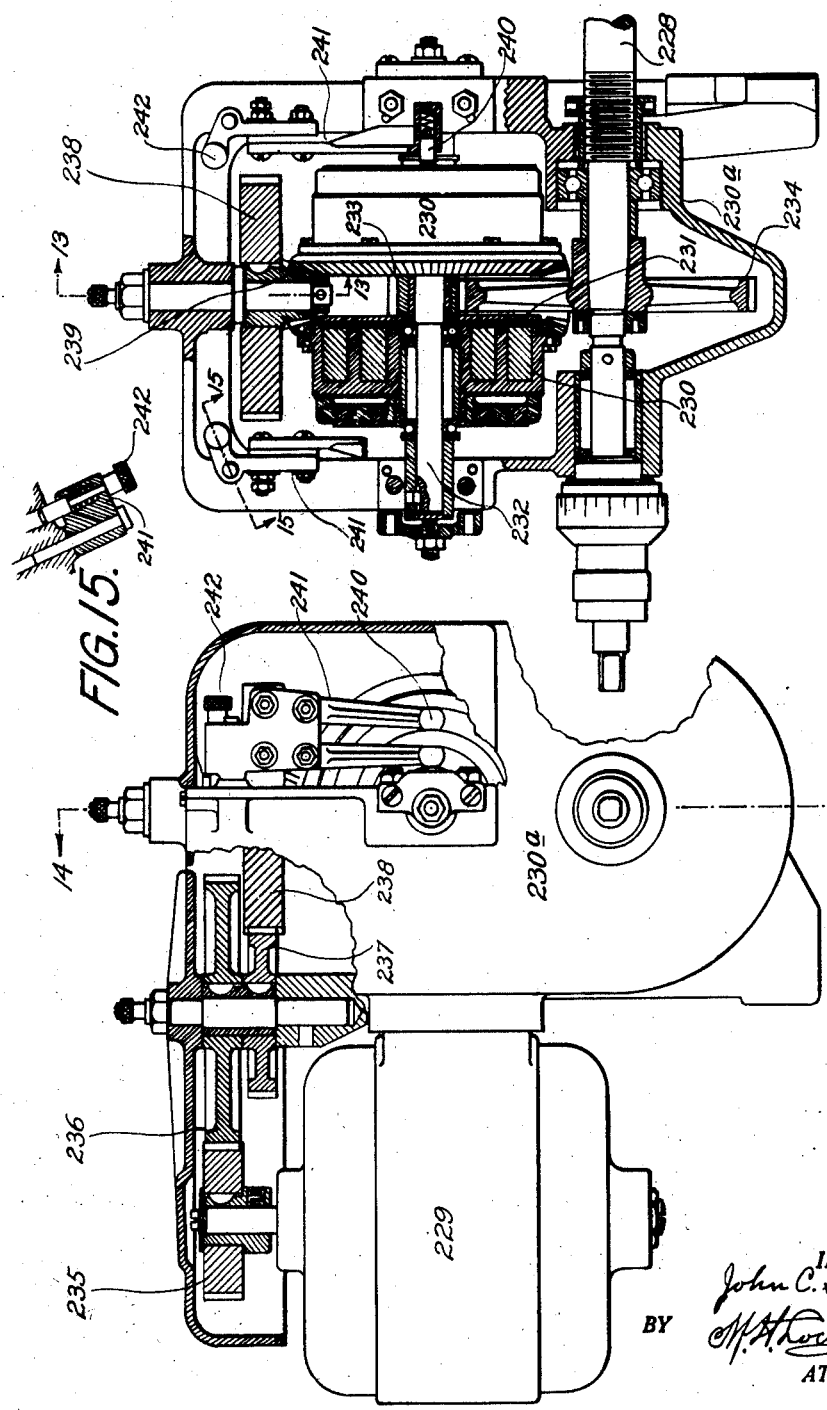

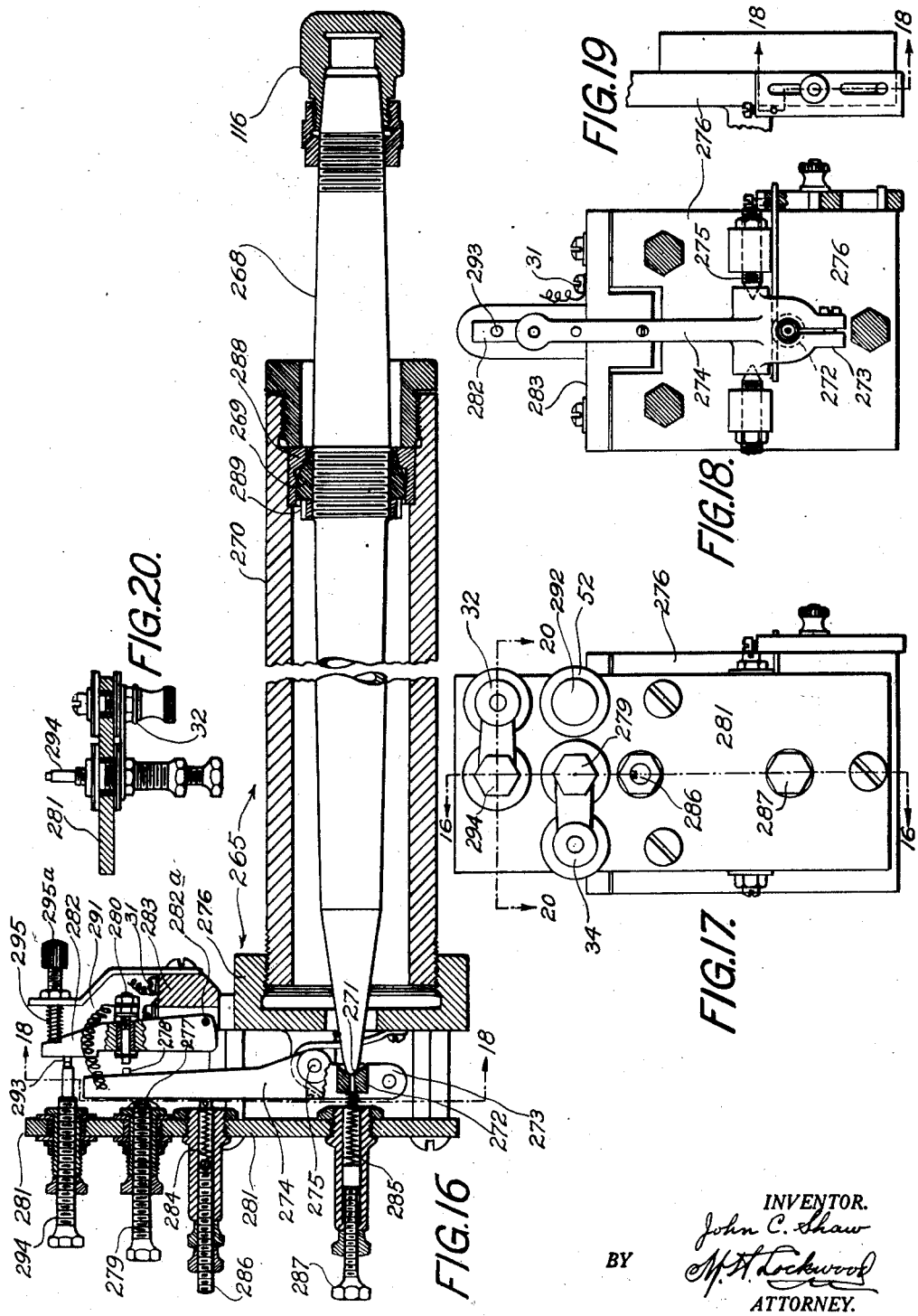

Sept. 4, 1928.
J. C. SHAW
1,683,581
ELECTRICAL OPERATION AND CONTROL OF MACHINE TOOLS
Filed March 4, 1924     11 Sheets-Sheet 8
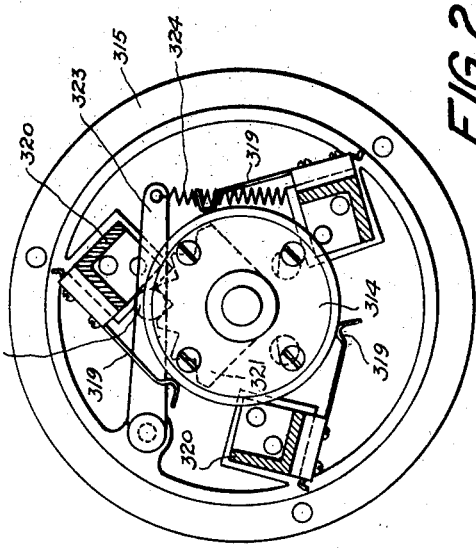
FIG.23.
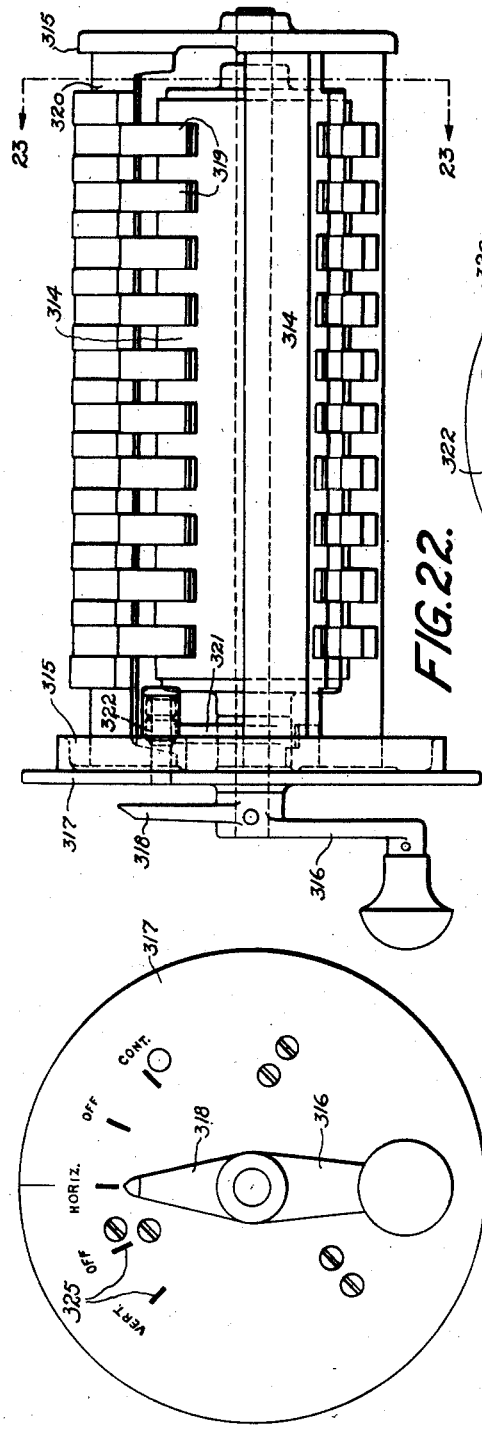
FIG.22.
FIG.21.
INVENTOR.
John C. Shaw
BY
N. H. Lockwood
ATTORNEY.

Sept. 4, 1928.

J. C. SHAW 1,683,581

ELECTRICAL OPERATION AND CONTROL OF MACHINE TOOLS

Filed March 4, 1924   11 Sheets-Sheet 10

INVENTOR.
John C. Shaw
BY
ATTORNEY.

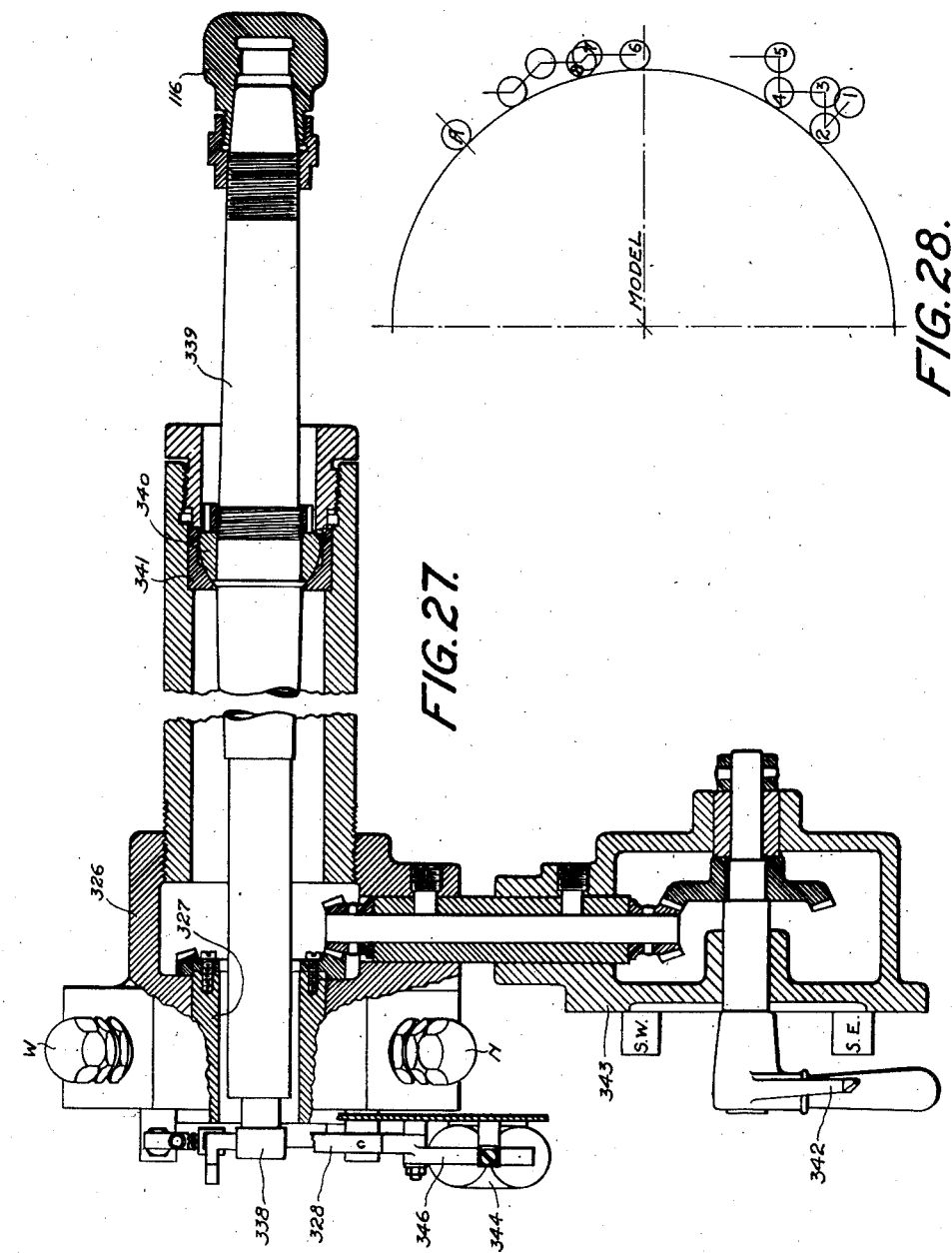

Patented Sept. 4, 1928.

1,683,581

UNITED STATES PATENT OFFICE.

JOHN C. SHAW, OF BROOKLYN, NEW YORK, ASSIGNOR TO KELLER MECHANICAL ENGINEERING CORPORATION, OF BROOKLYN, NEW YORK, A CORPORATION OF NEW YORK.

ELECTRICAL OPERATION AND CONTROL OF MACHINE TOOLS.

Application filed March 4, 1924. Serial No. 696,827.

This invention relates more particularly to metal cutting machine tools, in which screw operated motions are provided for relative movement between the work and a suitable cutter or mill, the movements being in the three coordinate planes or in three rectilinear directions at right angles to each other; and my improvement provides electric motors for operating the respective movements, together with electro-magnetic clutches and electric controlling contact relays and circuits, determining the relative motion in one or more of the three directions. In machines of this character, it is desirable to produce replicas of a given design from models or templates and, therefore, in my improved machine, I provide for the electrical control of the movements by means of a tracer following a template or model, the machine being provided with suitable switches and relays for automatic operation under control of the tracer or for manual control by the operator, as may be desired.

Figure 3:
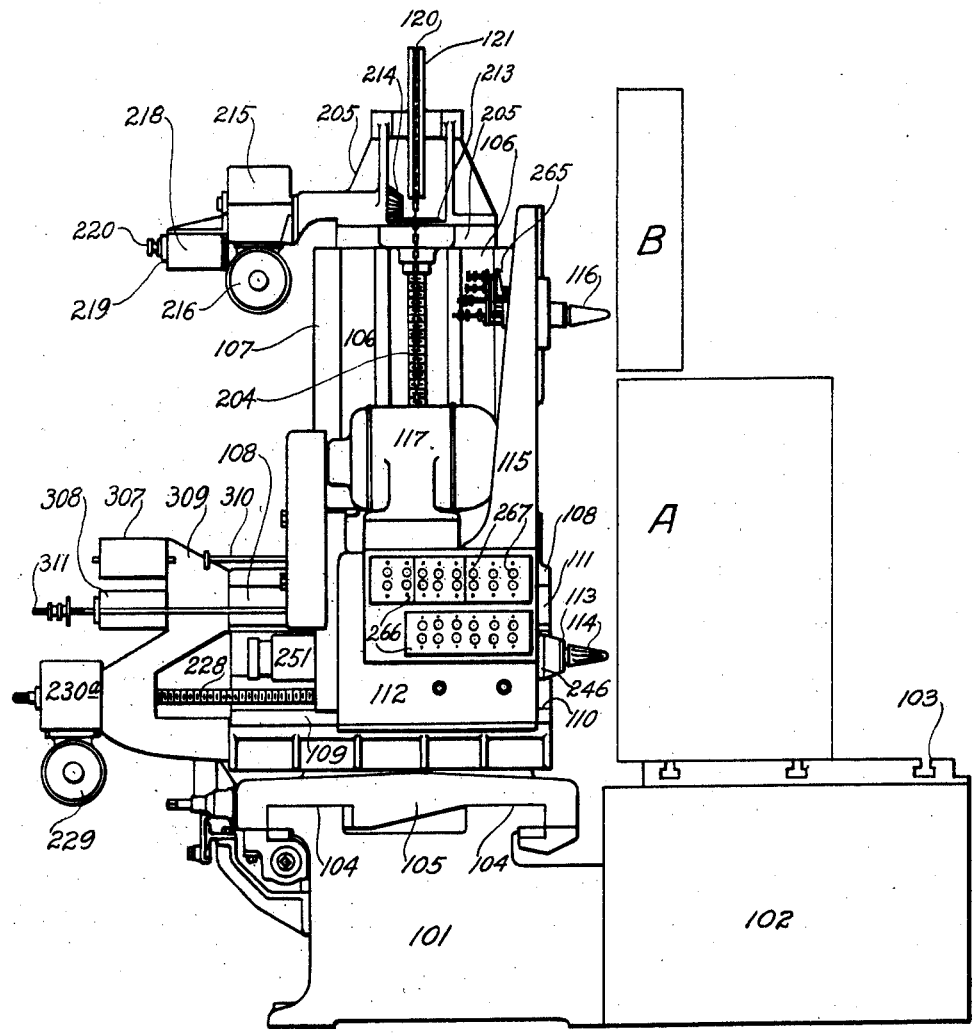
Figure 4:
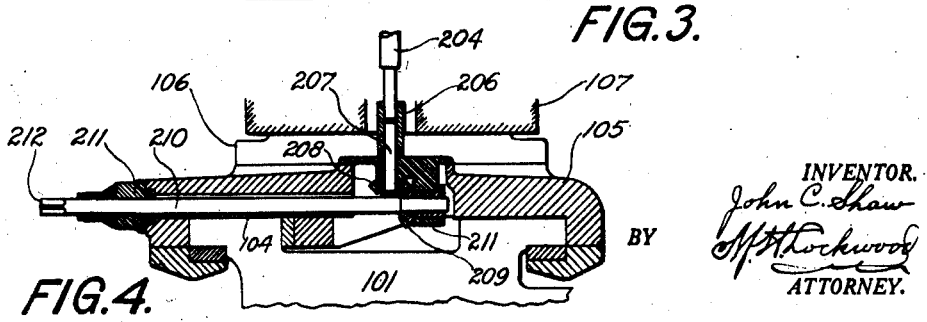
Figure 5:
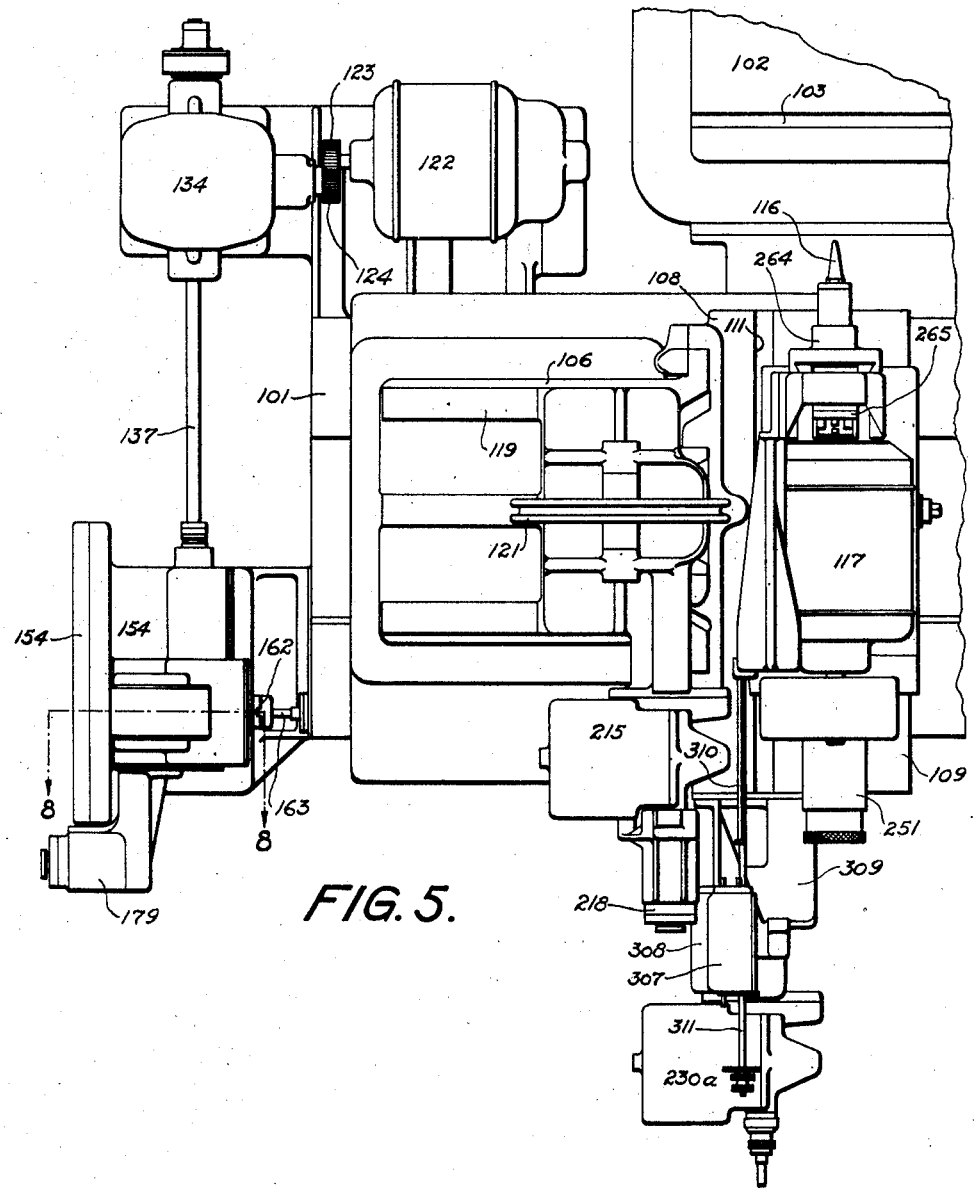
Figure 6:
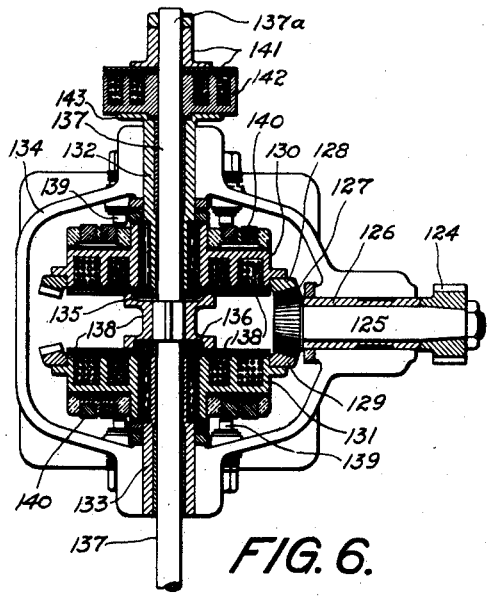
Figure 7:
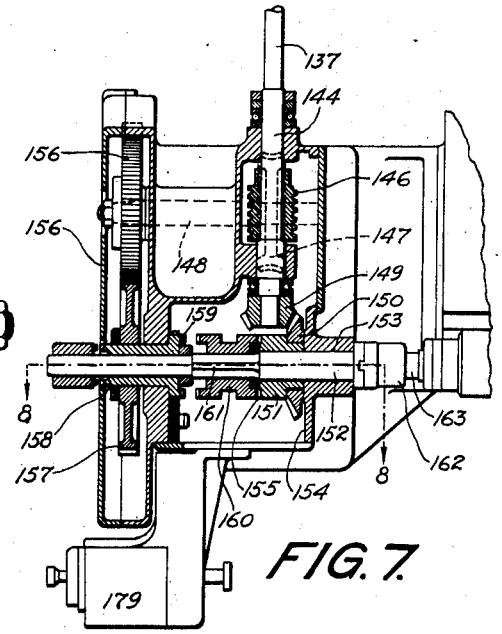
Figure 9:
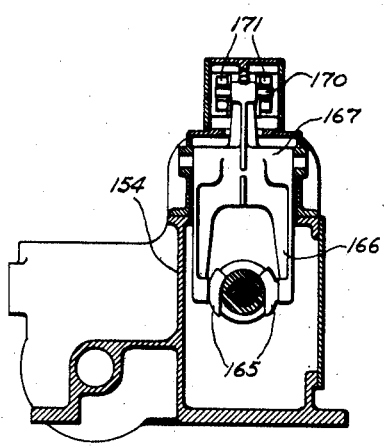
Figure 8:
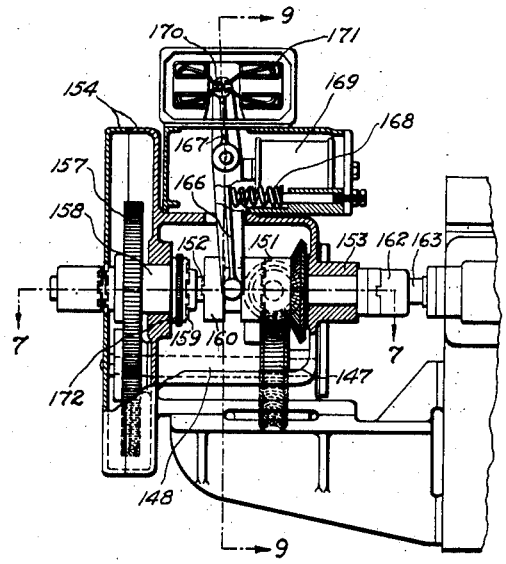
Figure 10:
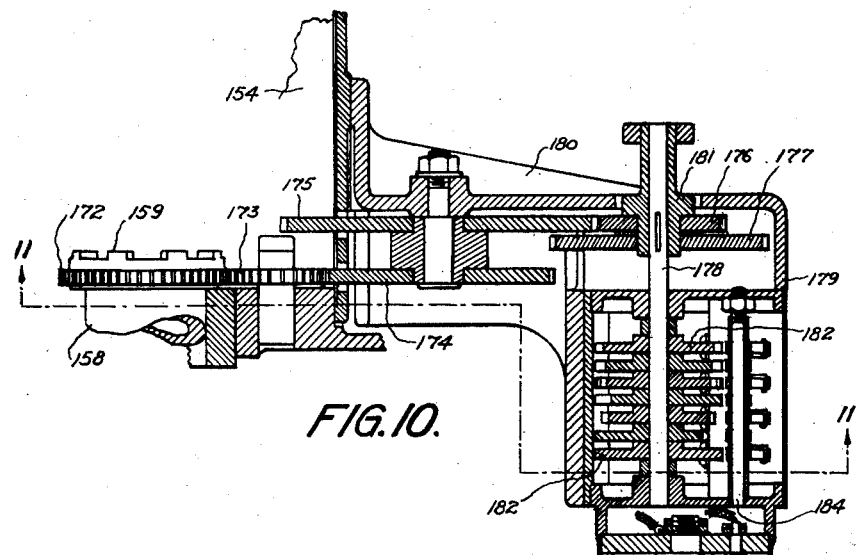
Figure 11:
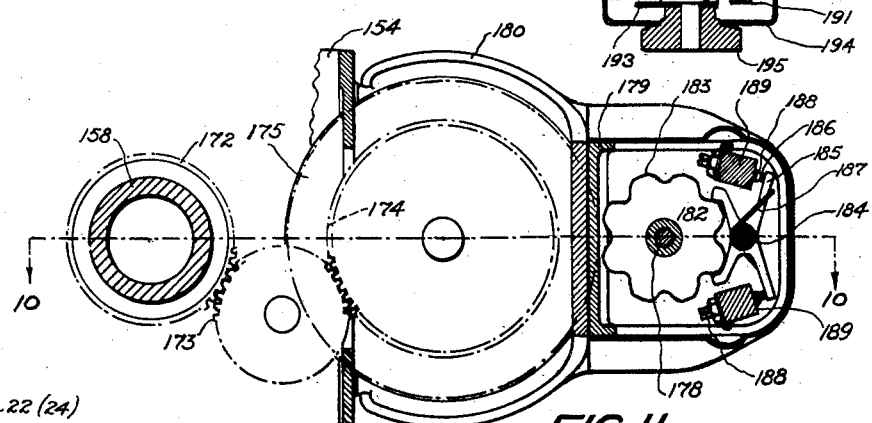
Figure 12:
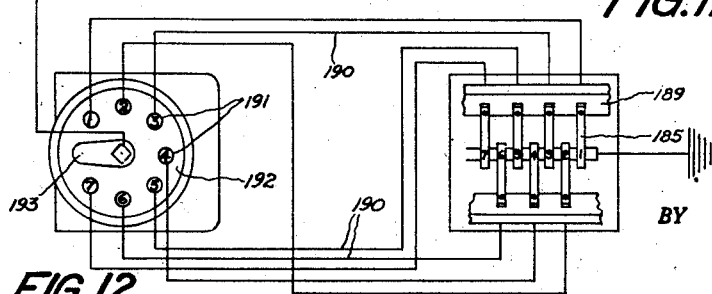
Figure 24:
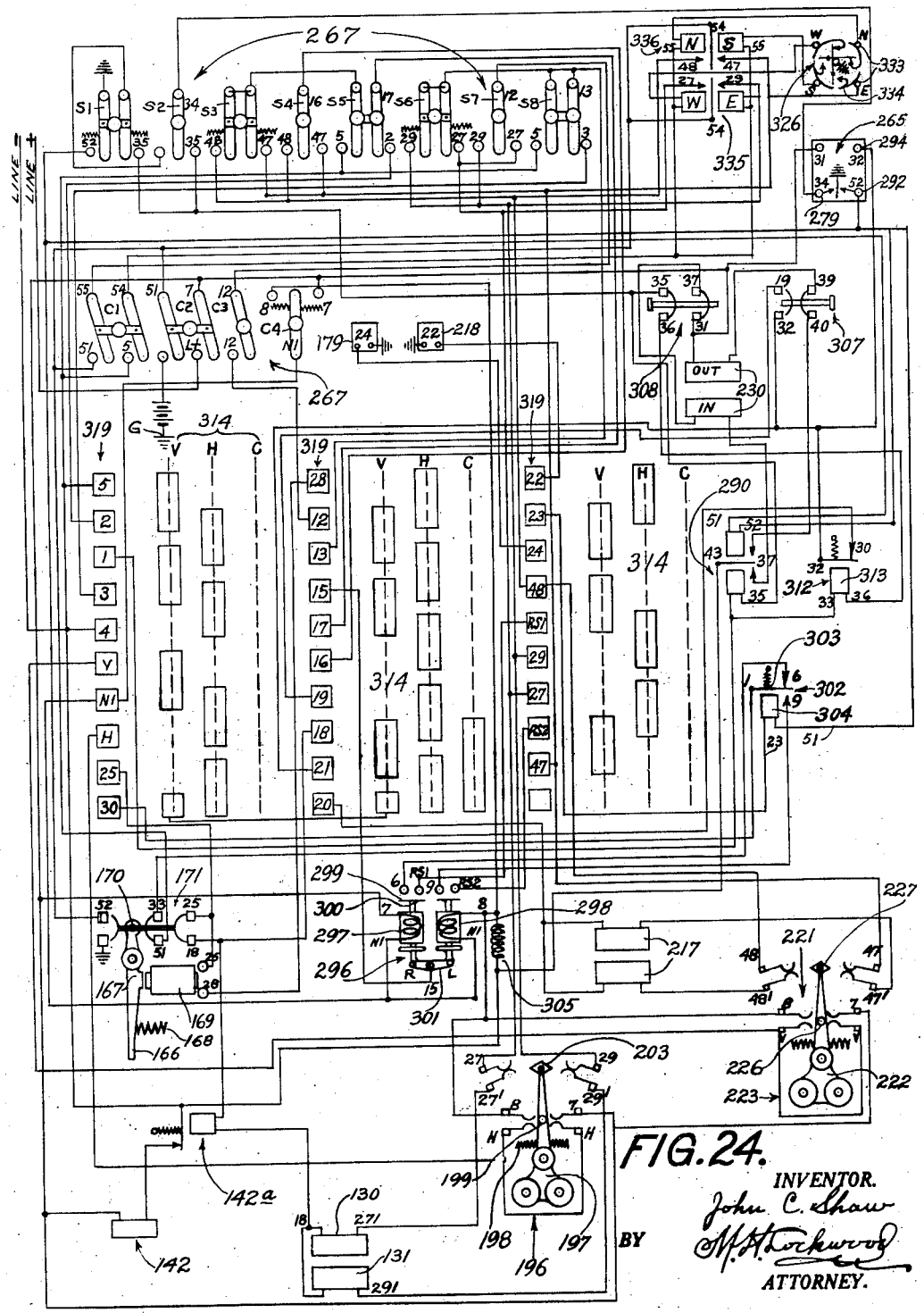
Figure 25:
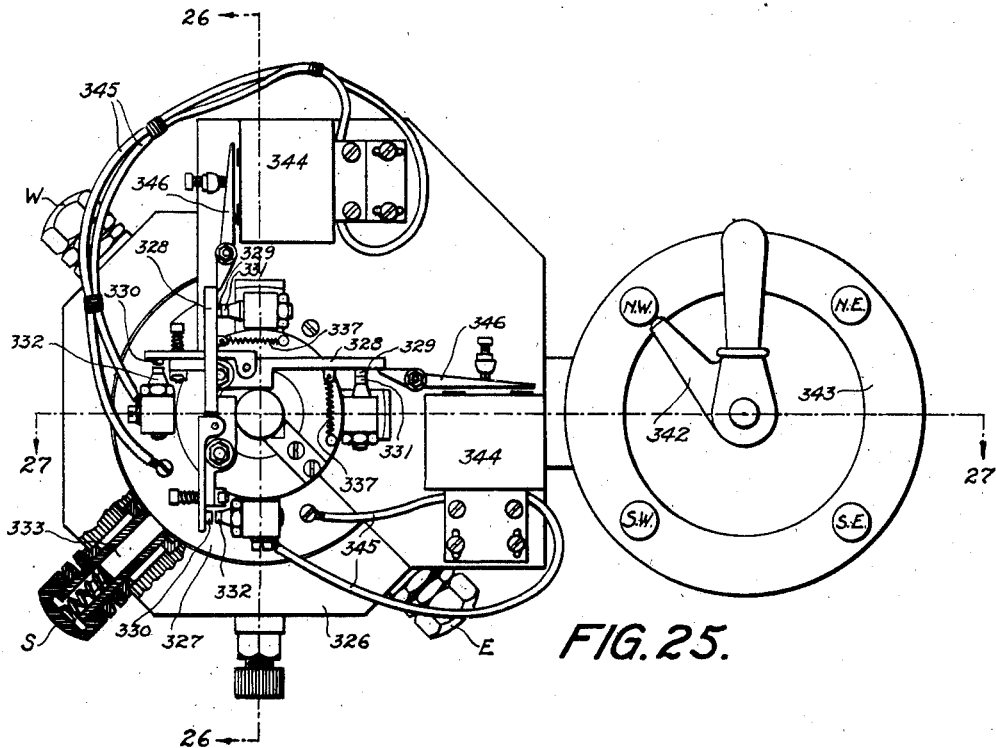
Figure 26:
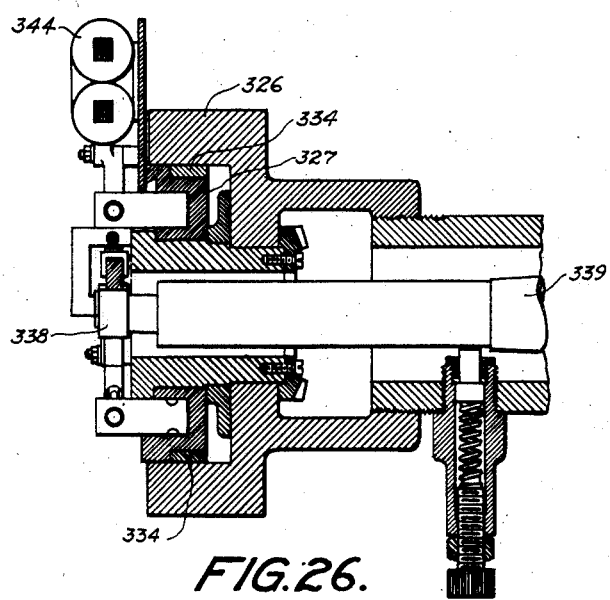

One form of my improved electrically operated and controlled metal cutting machine tool is shown in the accompanying drawings, which show the construction, mechanical details and wiring connections for my improved die sinking machine. Fig. 1 shows a front elevation of my improved machine; Fig. 2 shows a transverse vertical section on the line 2—2 of Fig. 1; Fig. 3 shows a side elevation of the machine, looking at the right end; Fig. 4 is a detail section on the line 4—4 of Fig. 1; Fig. 5 is a top plan view partially broken away; Fig. 6 is a horizontal section through the clutch case for driving the horizontal slide; Fig. 7 is a horizontal section of the gear case for the horizontal drive, the section being taken on the line 7—7 of Fig. 8; Fig. 8 is a vertical section through the gear case, on the line 8—8 of Figs. 5 and 7; Fig. 9 is a vertical transverse section on the line 9—9 of Fig. 8; Fig. 10 is a horizontal section through the horizontal feed contactor, the section being taken on the line 10—10 of Figs. 1 and 11; Fig. 11 is a side view of the feed contactor, partially in section on the line 11—11 of Fig. 10; Fig. 12 is a wiring diagram of the feed contactor; Fig. 13 is a front elevation, partially in section on the line 13—13 of Fig. 14, of the magnetic clutch drive for the transverse slide; Fig. 14 is a horizontal section of the clutch case, on the line 14—14 of Fig. 13; Fig. 15 is a sectional detail on the line 15—15 of Fig. 14; Fig. 16 is a longitudinal vertical section through the tracer on the line 16—16 of Fig. 17; Fig. 17 is a front elevation of the tracer head; Fig. 18 is a front elevation in section on the line 18—18 of Fig. 16, and partially in section on the line 18—18 of Fig. 19; Fig. 19 is a broken away side elevation, showing details of the balancing spring adjustment; Fig. 20 is a small sectional detail on the line 20—20 of Fig. 17; Fig. 21 is a front elevation showing the dial of the drum switch; Fig. 22 is a side elevation of the drum switch; Fig. 23 is a transverse section of the drum switch on the line 23—23 of Fig. 22; Fig. 24 shows a wiring diagram of the electrical connections with conventional representation of various switches and relays and a development of the drum switch; Fig. 25 shows a front elevation of the contouring tracer, one contact brush being shown in section; Fig. 26 shows a partially broken away vertical section on the line 26—26 of Fig. 25; Fig. 27 shows a horizontal longitudinal section of the contouring tracer on the line 27—27 of Fig. 25 and Fig. 28 shows a diagram indicating the operation of the contouring tracer.

This machine which is sometimes referred to as an engraving or die sinking machine, is, in principle of operation, a type of milling machine, and comprises a bed casting 101, (see Figs. 1, 3 and 5) the rear portion 102 of which is provided with T-slots 103 for holding the work A or a plate or bracket for supporting the work and the pattern or model B to be reproduced. The front of the bed 101, being in a horizontal plane, is provided with horizontal slide-ways 104, parallel to the plane of the work supporting plate (and to the T-slots 103) upon which there is a mounted and horizontally movable, a slide 105 carrying a column 106, rigidly attached thereto. One face of this column 106, lying transversely of the horizontal bed 101, is machined to form vertical slide-ways 107 for a vertical slide or saddle 108. The saddle 108, which is adapted to slide up or down on the vertical slide-ways 107 is made with a projecting shelf 109 along the lower edge, and both the upper face 110 of the shelf and the vertical face 111 of the saddle, at right angles to the shelf, are machined to form ways for a horizontally moving transverse slide 112 on which are mounted the spindle 113 carrying the cutter or mill 114 and a bracket 115 for supporting the tracer 265, having tracer point 116, as well as a motor 117 for rotating the cutter spindle 113.

It will be seen that this arrangement produces a machine, which provides for a horizontal motion, right or left; a vertical motion, up or down, and a horizontal transverse motion at right angles to the first mentioned horizontal motion, which may be designated as an in and out motion, with respect to the work A and pattern B. The three slides 105, 108 and 112, previously described are held to their respective slide-ways by means of suitable gib plates provided with adjustable taper gibs, in the usual manner. Motions or movements of the respective slides, horizontally, vertically and transversely, are obtained by means of lead screws rotatably mounted in bearings attached to the bed or to the respective ways and operating the various slides through suitable screw nuts attached to the respective slides.

The vertically moving slide or saddle 108 which carries the transverse slide 112, upon which the cutter head 114 and tracer 265 (tracer point 116) are mounted, is counterbalanced by means of a counter-weight 118 (Fig. 1) operating on slide-ways 119 on the column 106 and attached to the saddle slide 108 by a chain 120 passing over a sheave wheel or pulley 121 at the top of the column.

Power is supplied to each of the three lead screws by suitable gearing and motor driven magnetic clutches, these will be described hereafter, the horizontal drive mechanism being described first, as follows: (See Figs. 1, 5, 6, to 9). The gearing and clutches operating the column slide 105 are supported on brackets or extensions of the bed, at one end (the left in Fig. 1) of the slide-way 104, and are driven by an electric motor 122 located at the rear of the end of the slide-way portion of the bed 101. The motor 122 is connected through a pair of spur gears 123 and 124 to one end of a short horizontal shaft 125 (Fig. 6) rotating in suitable bearings 126 and carrying upon its opposite end a bevel pinion 127. This bevel pinion engages a pair of annular or ring bevel gears 128 and 129, each mounted upon and secured to a magnetic clutch 130 and 131. It will thus be seen that the pinion 127 rotated by the gears 128—129 will rotate the two magnetic clutches 130—131, which face each other, in opposite directions. The magnetic clutches 130—131 rotate upon quills 132 and 133, carried by the clutch gear case 134 and are held in place by suitable thrust bearings 135—136. Between the faces of these clutches and slidably keyed upon a shaft 137, which extends through and has its bearings in the above mentioned quills 132 and 133, is a double faced armature 138, which is permitted a small amount of lateral play between the clutch faces, so that when either clutch magnet 130 or 131 is energized, it will attract the disc armature 138 and hold it and the shaft 137 to rotate in unison with the energized clutch magnet.

The current for energizing the clutch magnets is supplied to them through carbon brushes 139, supported on the clutch case 134, and bearing against insulated collector rings 140 carried by the shells of the respective magnetic clutches. Both ends of the armature shaft 137 referred to, extend beyond the gear case 134, and the rear end 137ᵃ of the armature shaft carries another similar disc armature 141 slidably keyed thereto and adapted to cooperate with a brake magnet 142, substantially similar to the clutch magnets 130—131, previously described, except that it is rigidly mounted at 143 upon the outside of the frame of the clutch case. This last mentioned brake magnet 142 and its associated disc armature 141 constitutes a magnetic brake, for preventing over-travel of the horizontal lead screw, in either direction, and is so electrically connected, by suitable circuits and relays, (see wiring diagram Fig. 24) as to be brought into operation when the magnetic clutches 130—131 are out of operation, that is, the brake magnet is energized at all times when the clutch magnets are deenergized, and the brake magnet is always deenergized when either one or the other of the magnetic clutches in the clutch case 134 is energized. By this arrangement, it will be seen that the brake magnet will instantly stop the armature shaft when either of the magnetic clutches is released, thereby preventing the momentum of armature shaft from causing over travel of the column slide 105.

The end of the armature shaft 137, which extends toward the front of the machine, that is, the end opposite the brake magnet, is connected to a stub shaft 144 projecting from and having bearings in the change gear case 154, (Fig. 7). This stub shaft, within the case, carries a worm 146, cooperating with a worm wheel 147 mounted upon a horizontal shaft 148 at right angles to the worm or stub shaft 144. The front end of the worm 146 stub or worm shaft 144, beyond the worm 146 (Figs. 7 and 9), carries a bevel pinion 149, which meshes with a bevel gear 150 secured to a horizontally disposed sleeve 151 rotating on a shaft 152, having a bearing at 153 in the change gear case 154, the end of this sleeve being provided with teeth 155 to form one member of a jaw clutch. The axis of shaft 152 coincides with the axis of the horizontal lead screw, (163).

The previously mentioned shaft 148, carrying the worm wheel 147, is parallel to the axis of the last mentioned bevel gear sleeve and jaw clutch member 151 and this worm wheel shaft 148 carries a spur gear 156 upon its outer end, that is, the end opposite to the end carrying the worm wheel, which cooperates with another spur gear 157 mounted upon and secured to a rotating sleeve 158, in axial alignment with the clutch sleeve 151, the end of this sleeve 158 being provided with jaw clutch teeth 159. The two last mentioned spur gears 156 and 157, are mounted on their respective shaft and sleeve so that they may be readily removed and replaced by other gears of different ratios, so as to permit operation of the machine at various rates of speed, as may be required or best adapted to the work in hand.

Passing through the two sleeves 151 and 158, provided with jaw clutch teeth 155 and 159, is the shaft 152, previously mentioned, which has bearings in bushings carried by the sleeves 158 and the casing at 153, the central portion of this shaft being provided with a double ended jaw clutch spool 160, slidably mounted thereon and held to rotate with the shaft by suitable keys, such as 161 (Fig. 7). This spool clutch member 160 may be shifted longitudinally of its shaft so that it may engage with either the sleeve 151 of the bevel gear 150 or the sleeve 158 carrying the spur change gear 157. By this construction, two widely different gear ratios between the armature shaft 137 and the horizontal lead screw 163 is obtained. When the clutch spool 160 is in engagement with the bevel gear sleeve 151, the clutch spool shaft 152 is driven at a much higher rate of speed than when the clutch spool is in engagement with the sleeve 158 carrying the spur change gear 157, which, as previously explained, derives its slower motion through the worm 146 and worm wheel 147.

The shaft 152 carrying the clutch spool 160 is connected by means of a coupling 162, directly to the end of the horizontal lead screw 163, which is carried by suitable bearings 164 (see Fig. 1) on the front side of the bed 101, and, as previously explained, operates the column slide 105.

The double ended jaw clutch spool 160, for determining fast or slow movement of the horizontal lead screw 163, is operated longitudinally, to engage one or the other of the clutch sleeves 151—158, by means of shoes 165 mounted in a fork 166 on the end of a lever 167. Normally this clutch throw lever is held, by means of a compression spring 168, with the spool clutch jaws in engagement with the slow speed clutch sleeve 158 carrying the change gear 157, and the clutch spool is moved in the opposite direction to engage the bevel gear clutch 151, by means of an electro-magnet 169. When the electro-magnet is deenergized, the clutch spool 160 will be returned by the spring 168. The upper end of this clutch throw lever 167 carries a contact bar 170 which makes electrical connections, at either end of its throw, with various interlock switches 171, (Fig. 24) referred to hereinafter, in explaining the electrical equipment.

Geared, through gears 172, 173, 174, 175, 176 or through 172, 173, 174 and 177 (Figs. 10 and 11), to the slow speed clutch sleeve 158, which drives the spool clutch shaft 152, and thereby the lead screw 163, there is a small shaft 178, rotatably mounted in a casing 179 supported by a bracket 180 on the change gear case 154. This small shaft is rotated by one or the other of intermediate change speed gears 176 or 177, two of the previously mentioned gears which are of different size. The gears 176 and 177 are secured to a sleeve 181, keyed and slidably mounted on the small shaft 178 and shiftable to engage gear 177 with gear 174 or gear 176 with gear 175, thus providing for two speeds. The small shaft 178 carries a plurality of toothed discs 182, the teeth 183 of which are cam-shaped, and each disc is provided with a different number of teeth. Above or at one side of the discs is a rod 184 supported in the frame 179 and carrying a corresponding plurality of contact levers 185, cooperating with the respective toothed cam discs 182, for controlling the step by step feed of the column slide 105.

The contact levers 185 carrying contacts 186 are adapted to be held by springs 187 in circuit closing contact with screws 188, mounted in bars 189, of insulating material, each of which is connected by a lead wire 190 (Fig. 12) with one of a series of contact heads 191, mounted on a disc 192 of insulating material. A rotatable finger 193 is provided for completing the circuit, 24 of wiring diagram Fig. 24, through any of the contact heads 191 according to the amount of step by step feed required which, of course, is determined by the number of teeth on the corresponding disc 182.

The teeth of the discs 182 and the spaces therebetween are equal so that the contacts of the respective contact levers 185 are held closed or open during the same amount of rotation of the shaft 178 and, hence, for the same feed or rotation of the feed screw 163. The contact levers 185 control the relay 302, which, through the reversing switch 296 (as described later), controls the energizing of magnetic clutches 130, 131, so that the latter will effect step by step feed. The armature current of the relay 302, through the reversing switch, is so arranged that feed will take place alternately by rotation of a disc 185 for a space and then for a tooth distance at each reversal of the reversing switch 296.

This cam disc and contact lever mechanism, just described, is called the horizontal feed contactor, and, when in operation, controls the horizontal step by step feed either to the right or to the left. A suitable dial 194 and knurled button 195 are provided for selecting the contact carrying lever and disc giving the required amount of feed and, by turning the knurled button to different positions, one or another of the plurality of cam toothed discs may be brought into operation to control the step by step feed.

When the machine is operated to cut horizontally of the work, the column slide 105 is reciprocated longitudinally of the bed, first in one direction and then in the other. The amount of movement in either direction is limited by the reversing dogs 200 that are mounted on the bar 201, secured by bracket arms 202 on the front side of bed 101.

These reversing dogs 200 are so mounted as to be adjustable longitudinally over the entire length of the bar 201.

As will be seen in (Fig. 1) these reversing dogs 200 are adapted to cooperate with a switch lever 197, of the reversing contactor 196. The reversing contactor 196 is secured to the column slide 105. This switch lever 197 of the contactor 196 is held centrally, by means of springs 198 (see Fig. 24), the lever being provided with a contact bar 199 cooperating with oppositely disposed leaf spring contacts designated in the wiring diagram as 7—H and 8—H, which are adapted to short-circuit one or the other of a pair of magnet coils, hereinafter referred to in describing the reversing switch. As a matter of safety and to stop movement of the slide 105 in either direction, the upper end of the lever 197 is provided with a diamond-shaped lug 203, of insulating material, adapted to enter between one or the other of two oppositely disposed closed spring contacts 27—27' and 29—29' (see wiring diagram Fig. 24) located in the circuits of the respective clutch magnets 130—131, controlling the motion of the column slide 105. By this arrangement, it will be seen that excessive throw of the reversing contactor lever 197 will break the circuit of the magnetic clutch, which at the time is operating the lead screw, and stop the movement of the column slide 105.

The vertical travel mechanism will now be described. The saddle or vertical slide 108 carried by the column 106 is operated, as previously stated, by a lead screw 204 carried by the column. This lead screw is journaled in a bracket casting 205 fastened to the top of the column and is provided with upper and lower ball thrust bearings which may be adjusted to eliminate lost motion. The lower end of the lead screw 204 in Fig. 4 is connected by means of a coupling 206, to a stub shaft 207 carrying a bevel gear 208, which cooperates with a bevel gear 209 mounted on a horizontal shaft 210. This horizontal shaft (210) is carried in bearings 211 in the horizontal slide 105 and terminates at 212 in a squared end for the reception of a crank handle, whereby the vertical slide or saddle 108 may be operated by hand. The upper end of the vertical lead screw 204 carries a bevel gear 213 cooperating with a bevel pinion 214 secured on a horizontal shaft rotatably mounted in the bracket or casting 205 at the top of the column in which the lead screw 204 is journaled. This last mentioned shaft is connected to a short shaft (corresponding to shaft 137 in Fig. 6) mounted in a magnetic clutch casing 215 and operated by a slidably splined armature disc cooperating with a pair of motor (motor at 216) driven magnetic clutches 217, indicated in wiring diagram Fig. 24. This magnetic clutch drive mechanism is substantially of the same design, construction and mode of operation as that previously described (Fig. 6) in connection with, and for the operation of, the column slide 105, and need not be again described in detail. Or the drive of the vertical lead screw, by the clutch magnets 217, may be the same as that hereinafter described for the transverse movement and shown in Figs. 13 to 15.

On the clutch case 215 of the magnetic clutches, operating the vertical lead screw 204, there is mounted a small casing 218 (Figs. 1, 3 and 5) containing a feed contactor for step by step vertical feed, corresponding with, and of the same construction as the horizontal step by step feed contactor 179, (Figs. 10 to 12) previously described in connection with the horizontal feed mechanism. This vertical feed contactor 218, like the horizontal feed contactor 179 is geared to be operated by the magnetic clutch armature shaft driving the vertical lead screw 204 (Fig. 1). As with the horizontal contactor a graduated dial 219 and knurled head 220 are provided for selecting the step by step feed desired. It will be understood that this vertical feed contactor 218 is adapted to be brought into operation for controlling up or down step by step feed only.

The reversing contactor 221, limiting travel in either direction, of the vertical slide 108, is identical in construction and operation to the reversing contactor 196, previously described, but in this case, the switch lever 222 (corresponding to 197) is operated by a vertical movable bar 223 (see Fig. 1) upon which limiting dogs 224 are mounted in position to cooperate with a lug or finger 225, projecting from the vertical slide 108. The reversing contactor lever 222, as will be seen in the wiring diagram, Fig. 24, is provided with a contact bar 226, cooperating with spring contact members, designated at 7—V and 8—V, for short-circuiting the respective magnet coils of the reversing switch, as hereinafter described. The upper end of the lever 222 has a diamond-shaped lug 227, cooperating with, and adapted to open, closed contact spring fingers, designated as 47—47', 48—48' (Fig. 24) which are included in the circuits of the respective clutch magnets 217, operating the vertical lead screw 204, thereby stopping movement of the vertical slide.

The transverse or in and out motion for the cutter 114 and tracer (265) is obtained by operating the transverse lead screw 228 (Figs. 1 and 3), mounted on the vertical slide or saddle 108 and engaging a nut on the transverse slide 112, previously described as slidably mounted between the wall or vertical face 111 of the saddle and the shelf 109, extending from the lower edge thereof. This transverse lead screw 228 is driven, in either direction, (see Figs. 13—15) by an electric motor 229 operating through magnetic clutches 230 and a clutch armature 231 on a shaft 232 connected to the lead screw 228, through a pinion 233 and gear 234, and since the construction and mode of operation of this magnetic clutch mechanism is substantially identical with that described in connection with and for operating the horizontal and vertical lead screws, it will, therefore, not be necessary to repeat here, a description of this mechanism. The main difference from that shown in Figs. 6—9 are that the magnetic clutches 230 are driven from the motor 229 through intermediate gears 235, 236, 237, 238 driving the pinion 239; and the clutch magnet brushes 240 are mounted on arms 241 so that they can be swung outward by withdrawing the locking pin 242 (Fig. 15).

As stated earlier, the cutter head carrying the cutter spindle 113, is mounted upon the transverse slide 112, which is mounted on the saddle 108 and shelf 109 and movable in and out by the transverse lead screw 228, just described. The cutter head or slide 112 mounted on the transverse slide-ways 110—111 comprises a rectangular box-like casting 243 (Fig. 2), provided with a tubular shell 244, which is bored out at 245, approximately through the center, to form the circular slide bearings to carry the main spindle sleeve 246. The main spindle sleeve 246 is slidably mounted in the bore 245 in the cutter head and is provided with a longitudinal rack 247, cut directly thereon, which meshes with a spur pinion 248, the latter being rotatably mounted for adjusting the spindle in and out. The spindle sleeve 246 carries a taper bushing 249 at each end, forming bearings for the cutter spindle 113 which is rotatably mounted therein. The rear end of the cutter spindle, that is, the end toward the work supporting plate or bracket, is provided with the usual taper hole for the reception of taper shanks of various cutters 114, mills or other cutting tools that are required in the operation of the machine. The other or forward end of the cutter spindle extends considerably beyond the end of the spindle sleeve 246 and is provided with a feather 250 extending along the spindle for several inches, so as to permit adjustment of the spindle and spindle sleeve fore and aft, of the head, by means of the pinion 248 and rack 247 associated with the spindle sleeve, as previously described.

The feathered end of the cutter spindle extends into a sleeve gear 251, carried in suitable bearings 252 at the front end of the head casting 243, the sleeve gear 251 being provided with a key-way engaged by the feather 250 on the end of the spindle 113. This sleeve gear is driven by means of a spur pinion 253 rotating upon a stud 254, the spur pinion being provided with a hub 255, having a slot and key for the reception of one of various change gears, 256. Another stud 257, also mounted on the head casting parallel to the first mentioned stud 254, carries a similar spur gear 258 with a hub or sleeve 259 having a seat for another change gear 260 adapted for cooperation with the previously mentioned change gear 256. The spur gear 258 carrying this second sleeve engages directly with a pinion 261 on the shaft 262 of the motor 117, for driving the cutter 114; the motor, as previously described being mounted upon the top of the aforementioned rectangular box-shaped head casting 243, (see Figs. 1, 2 and 3). All of these parts, therefore, move with the transverse slide 112, in and out of the saddle 108, when the transverse lead screw 228 is operated. It will thus be seen that the cutter spindle 113 is driven by the motor 117 on the transverse slide through the intermediate pinion, spur change gears and the feather connection 250 of the spindle with the sleeve gear 251.

As previously stated, the transverse slide 112 on the saddle 108 carries a tracer supporting bracket 115 (Figs. 1, 2 and 3) secured to the spindle head casting 243. This bracket is provided with a vertically adjustable slide 263 directly above the cutter spindle and adjustably mounted upon this slide is another slide or bracket 264, in which is secured an electric tracer 265 for controlling the movements of the cutter head. The cutter and tracer being thus mounted to move in unison, it will be understood that, since the machine is provided with the three motions previously described; that is, horizontal, vertical and transverse; the tracer (point 116) operating over a model or pattern, can be made to follow any three dimensional surface, and the cutter (114), moving in unison therewith, will reproduce the surface of the model or pattern in the work.

Various operations of the machine may be controlled from a switch board 266, shown in Fig. 3 as mounted upon the slide 112. The switches 267 are, preferably, of the push-button type, but for clearness they are shown conventionally in Fig. 24. The switches and various circuits, controlled thereby will be more fully described later.

Operation of the machine under the control of the tracer will be best understood by describing the mechanism of the electric tracer 265 in connection with its operative control of the machine. The tracer 265, which, as previously pointed out, is mounted upon the tracer bracket 115 on the transverse slide 112, above the cutter spindle 113, in such a manner that the axes of the cutter and tracer lie in the same vertical plane. The tracer 265 (see Figs. 16 to 20) comprises the tracer point 116 mounted upon the end of a spindle 268, which is mounted for universal lateral movement of its ends by means of a ball joint 269, located near the middle of the spindle. The tracer spindle 268, pivoting on the ball joint is supported in a sleeve 270 forming part of the body of the tracer. The end of the tracer spindle toward the front of the machine and opposite the tracer point, terminates in a hemispherical hardened point 271, which bears in a conical shaped cup or seat 272 mounted in the lower or short end 273 of a contact lever 274, pivoted at 275 to, and grounded through the head casting or frame 276, mounted upon the front end of the spindle supporting sleeve 270. The upper and longer arm of the contact lever 274, carrying at its lower end the conical shaped cup seat 272, is provided with two contact points 277 and 278 mounted upon opposite sides thereof, front and back, in position to cooperate with contact screws 279 and 280, respectively, one of which (279) is insulated from and rigidly supported on a bracket plate 281 on the tracer head 276, and the other, 280, in an insulating bushing, is carried by a secondary or floating lever 282, pivoted at 282ª to a bracket 283 mounted upon but insulated from the tracer head 276, (Fig. 16). The front contact 277, is mounted on the front of the contact carrying lever 274, that is, on the opposite side of the lever from the conical cup 272, and the lever is drawn against or towards the front contact 279 by means of a suitable spring or springs, such as at 284 and the spring 285 thrusting against the lower end 273 of the lever, and the tension of the respective springs is adjusted by suitable screws 286 and 287. The spring tension upon this contact lever 274 also holds the centering conical seat or cup 272 in contact with the hemispherical end 271 of the tracer spindle 268 and forces the spindle longitudinally into its ball seat 288. The ball joint 269 of the spindle is hemispherical and the seat 288 is hemispherical merging into a cylindrical elongation at 289, so as to permit slight longitudinal movement of the tracer spindle against the action of the spring tension, previously mentioned as operating against the contact lever and holding the spindle in its seat.

It will thus be seen that longitudinal pressures along the axis of the tracer spindle 268, caused by contact of the tracer point 116 with the pattern, will move the spindle against the tension of springs 284 and 285, holding the contact lever 274, and the latter will be moved on its pivot so as to open the front or normally closed contacts 277, 279. This pair of front contacts control the circuits 33—35 and 33—36 of the relays 290 and 312, (see Fig. 24), which in their turn control, respectively, the circuits 37—31 to the "in" magnetic clutch and the circuit 32—30 on relay 312 through the respective wires 18 or 20 to the horizontal or vertical magnetic clutches.

The breaking of this front contact (277, 279) will stop the movement of the tracer and cutter toward the pattern and work. At the same time, through the relay 312, the horizontal or vertical motion (which of these motions will depend on the position of the drum switch 314, described later) is released. When the front contact 277, 279 is again closed, as it is normally, the movement of the tracer and cutter will be inward or toward the work and the vertical or horizontal movement will be arrested.

From the foregoing explanation it will be seen that the horizontal or vertical movement which ever is in use, is actually under control of the front contact on the tracer, through the interlock relay 312, thus constituting an electrical interlock between the "in" motion and horizontal or vertical motion.

The second contact 278, mounted upon the rear of the contact lever 274, as previously explained, cooperates with a contact 280 on the secondary or floating lever 282, which is back of the first lever. This back contact 280 is connected, by means of wire 291, to the binding post 292 (Fig. 17) and controls the circuits 52—51, in wiring diagram (Fig. 24), of the relay 290, which in turn controls the other of the magnetic clutches 230, designated "out" in Fig. 24, so that when the contacts 278, 280 is closed, the spindle head carrying the tracer 265 and cutter 114 will move outward and withdraw the cutter from the work. The floating lever 282 carries a secondary contact 293 at its upper end, cooperating with a fixed contact screw 294 passing through an insulating bushing on the bracket plate 281 on the tracer head; these contacts being opened against the pressure of a spring 295, on the end of an adjustable limiting screw 295ª, when the pressure upon the floating lever 282, by the main contact lever 274, (by contact 278 against contact screw 280) becomes excessive through the motion of the tracer spindle 268. The circuit through the lever 282 is completed through screw 31 (Figs. 16 and 18, same as 31 on 265 in Fig. 24). Breaking these floating lever contacts 293—294 stops motion of the column slide 105, through circuits 32—31 and 18, as shown on wiring diagram Fig. 24.

The secondary or floating lever 282 is operated by the main contact lever 274 only when the back contact 278 thereof engages the contact 280 on the floating lever, and since these contacts, as previously explained, control the reverse travel of the transverse slide 112, the spindle head with the cutter 114 and tracer 265 will be moved outward to withdraw the tracer point 116 from the model and the cutter from the work prior to, or at the time that the contacts 293, 294, at the upper end of the floating lever 282, are broken. Now, since the contacts 293, 294, are in the circuits 32, 31 which operate through the horizontal magnetic clutches 130, 131 to control the movement of the column slide 105, it will be seen that, by this arrangement, the "out" transverse motion and the horizontal motion are thereby electrically interlocked.

The hemispherical tip 271 on the front end of the tracer spindle 268, previously described as seated in the hardened conical cup or seat 272 on the contact lever 274, permits of another condition of operation. Thus, if the pressure is brought to bear upon the tracer point 116, from the side, the conical cup seat 272 will act as an inclined plane, whereby the lateral movement of the tip 271 will move the lever 274, and force open the front contact 277, 279, for the "in" movement, as previously described, and stop the motion of the head 112 toward the work. A little greater side pressure on the tracer point will move the lever 274 still further and cause the reversal of the "in" motion, by closing the rear contact 278—280 (on the floating lever 282), and upon continuing this side pressure, the secondary contact 293—294 on the floating lever will be opened to stop the motion of the column slide 105. Suppose the machine to be operating horizontally, then this opening of the contact 293—294 comes into play only when the tracer point 116 has encountered a wall, or portion of the model (B, Fig. 3) that projects at right angles to the plane of the model and has the surface, encountered by the tracer point, in a plane parallel to the vertical slideway 107 of the column 106, and the tracer and cutter will withdraw from the work, keeping the contact with the projecting wall until clear of it, and will then continue operation on the surface. If the angle of this wall, instead of being 90°, has a draft of 8° or 10°, such as is met with in drop-forge or stamping dies, the action will be such that the secondary contact 293—294 on the floating lever will make a series of momentary contacts, which will cause the column slide 105 to move slightly at each contact and by this means contact will be maintained between the tracer point 116 and the model until clear of the projecting wall.

The general operation in cutting a die is to run the machine so as to move the tracer and cutter horizontally or vertically in a series of cuts, extending the full length or width of the work.

I shall now describe the horizontal operation of the machine as an example. The horizontal travel of the machine is set to cover the surface of the die, that is, as to its length, by means of the trip dogs 200, (Fig. 1) which, by throwing the reversing contact 196, 197 automatically reverses the travel of the column slide 105. As the column slide 105, carrying the tracer and cutter, travels longitudinally in front of the work, the milling cutter 114, under control of the tracer 265 will move in and out by movement of the transverse slide and describe a surface which coincides with that of the model which is followed by the tracer point 116.

At both ends of the horizontal cutting stroke, the cutter and tracer are moved vertically, either up or down, for the step by step feed, by moving the saddle slide 108 a sufficient amount to form the next cut; the amount of step by step feed, thus given, being controlled by the vertical feed contactor 218 (same as shown in Figs. 10 to 12) the setting of which is governed by the cutting power of the machine or by the degree of finish required. In other words, there is a succession of milling cuts in a horizontal direction with a step by step feed in a vertical direction, either upward or downward, until the entire surface of the work is machined.

This step by step feeding mechanism 218 is automatically placed in operation, at either end of the horizontal travel, by means of the magnetically thrown reversing switch which controls the operation of the column slide 105, through the action of the dogs 200 on the reversing contactor lever 197, (see wiring diagram Fig. 24).

To make this operation of the machine clearer, it is desirable to describe the whole reversing and feed mechanism as follows:— The column slide clutch magnets 130—131 are controlled by means of a magnetically thrown reversing switch 296, (Fig. 24). This switch is the equivalent of a double pole, double throw switch and consists of two plunger-type electro-magnets 297, 298, carrying contact plates 299 mounted on the tops of the respective magnet cores 300. These cores, and hence the contact plates 299, are mechanically interlocked through a lever 301, so that only one side of the switch may be closed at a time. Then, when one side of the switch is closed, and one side or the other is always closed, the plate 299 of one core 300 contacts with two copper brushes 6 and RS1, or 9 and RS2, one of these brushes (RS1 or RS2) supplying current to the column slide clutch magnets 130, 131, and the other brush (6 or 9) supplying current to the armature contacts of the feed relay 320, controlling step by step feed, which is effected by one or the other of the vertical feed magnetic clutches 217 and controlled by the feed contactor 218, (22 in Fig. 24). The two brushes 6 and 9 of the reversing switch 296, supplying current to the step by step feed relay 302, are connected to the two contact bars 6 and 9, respectively, of the relay (302), so that, as the reversing switch is operated from one side to the other, the current to the relay 302 is thrown from one contact bar to the opposite contact bar. The relay armature or lever 303, carrying the contacts cooperating with the two contact bars 6 and 9, is operated by the vertical feed contactor 218 (22 in Fig. 24) previously described, which controls the circuit to the relay magnet coil 304, and as the feed contactor cams 182 (Figs. 10, 11) rotate, the particular cam 182, selected according to amount of feed desired at each step, through its lever 184 and contacts 186, 188, will alternately make and break this relay circuit. It can be readily seen that with the relay 302, in the open position (relay magnet deenergized), and the armature lever 303 making contact with the outer contact bar 6, the reversing switch 296 throws the current to the outer contact bar and the machine will feed until the shaft 178 of the feed contactor has turned a sufficient amount to permit the feed contactor cam 182, previously selected, to close the circuit through the relay magnet 304. This action will cause the armature 303 of the relay to be attracted, thereby breaking the circuit through the outer contact bar 6 and stopping the step by step feed. This armature (303) contact will remain in contact with the inner contact bar 9 until the machine has travelled its entire stroke, then the reversing switch 296, being again operated, will throw the current to the inner contact bar 9 and the feed contactor cam 182 will again revolve in another feed step until the relay magnet circuit 23 (Fig. 24) is broken, after which the previous cycle will be repeated.

The magnetically thrown reversing switch 296, just described in connection with the relay 302, is operated as follows:—(See Fig. 24). The two plunger-type magnets 297, 298 are connected in series, with an additional fixed resistance 305 across the line. Therefore, these two magnets are carrying current continuously. Under these conditions this magnetically thrown reversing switch will be closed in either one or the other of the two positions, and, as previously pointed out, only one side of the switch can be closed at a time.

In order to effect the reversal of this reversing switch 296, it is merely necessary to short circuit one of the magnet coils 297, or 298, that is, the one on the closed side of the switch. This action demagnetizes this magnet and permits the other magnet, which is already energized, to throw the reversing switch over. This momentary short circuiting is effected by means of contactors 7H and 8H of the reversing contactor 196, operated by the adjustable trip dogs 200 (Fig. 1), as previously described. The reversing switch 296 may be operated also by means of a momentary contact switch C4 (N1, 7, 8) on the main control switch board 267 (see Fig. 24). This switch C4 is wired in parallel with the reversing contactors 7H and 8H and may be used at any time to reverse the machine, at any part of the stroke.

Furthermore, the step by step feeding mechanism, just described, may be placed in operation or not, at the desire of the operator, by means of a suitable switch. It will be understood from the description thus far given that, while I have described the operation of the machine with travel horizontally and step by step feed vertically, the same operation of the reversing switch 296 takes place when the travel is vertical and the step by step feed horizontal, these being controlled, respectively, by the contactors 7V and 8V of the vertical reversing contactor 221 (Fig. 24) and the horizontal feed contactor 24.

The "in" and "out" or transverse motion of the cutter 114 and tracer 265 by motion of the transverse slide 112, is limited, for convenience and safety, by two limit switches 307 and 308 (see Figs. 1, 3, 5 and circuits 39, 40 and 37, 31 in Fig. 24). These limit switches are mounted, in suitable enclosures, or casings 307 and 308, supported by a bracket 309 on the saddle casting 108 and operated respectively by adjustable rods 310 and 311, carried by the cutter and tracer slide block 112 (Figs. 1, 3 and 5). Combined with these two limit switches 307 and 308 are two other switches 19, 32 and 35, 36, used for interlocking purposes. The depth limiting switch 308 will stop the travel of the head towards the work, at any predetermined point for which this switch is set, by adjusting the depth limit rod 311, above mentioned. There is provided, in connection with the tracer 265, an interlock relay 312, the action of which has been described with the tracer, which will not permit the column slide 105 to move so long as the tracer point 116 is out of contact with the work, thus permitting front contact 277—279 (Fig. 16) to remain closed, as a result of which, it will be seen that if the motion of the cutter head 112, towards the work, is stopped or limited by the depth limit switch 308, 311, the machine would be inoperative from that time on. In order to permit the machine to travel after the motion of the head (transverse slide 112) has been interrupted by the depth limit switch, there is combined with this depth-limit switch, an interlock switch 35, 36 (308, Fig. 24) which permits the column slide to travel when the head 112 has been stopped by the depth-limit switch, this being effected by breaking the circuit 36, 33 of magnet coil 313 of relay 312.

The out-limit switch 307 for the transverse slide 112 operates in a similar manner to the depth-limit switch 308, and permits the machine to withdraw the head from the work, automatically, to a point predetermined by the setting of the adjustable rod 310 of the out-limit switch 307, at which point the head will be stopped in its outward travel, the rod 310 opening switch 39, 40 of Fig. 24.

Combined with this out-limit switch is another switch 19, 32 (Fig. 24) known as the high speed interlock. This high speed interlock located in the casing 307 on the bracket 309, Fig. 3, operates in conjunction with the high speed interlock, 170, 171, see Figs. 8, 9 and 24, the latter operating by means of the high speed clutch lever 167, described earlier. Under certain conditions, particularly on heavy cuts, it is desirable to operate the machine so that the cutting is accomplished with the cutter rotating against the direction of travel. This condition necessitates the rapid return of the column slide 105 at the end of the cut. The desired slow motion is secured by using the proper ratio change gears 156, 157 (Fig. 7) in the gear box 154 on the bed, as described previously. Now, by the proper setting of the switches 267, as pointed out later, the column slide 105 will travel slowly in one direction, and when it (the column slide) has reached the end of its travel, it is automatically reversed by the trip-dog 200 actuating the reversing contactor lever 197. This action, with the proper switches 267 closed, causes the clutch throw magnet 169 to be energized, which throws the jaw clutch spool 160 from the slow speed gear 157 into gear with the high speed gear 130. Immediately this clutch is thrown, the high speed interlock 170, which is thrown at the same time, locks out the travel of the column slide 105 and closes a switch 52, in high speed interlock 170, 171, (Fig. 24), which causes the cutter head to be withdrawn from the work to a safe clearance distance, predetermined by the setting of the out limit switch 307. Stopping the motion of the head by the out-limit switch 307, at the same time, closes the high speed interlock switch 19, 32, mounted on the same bar as the out-limit switch 39, 40 (Fig. 24). This interlock switch closes the circuit to the proper one of the clutch magnets 130, 131, previously selected by setting of the proper switch in switch board 267, operating the horizontal lead screw 163, and permits the column slide 105 to rapidly return to the point where the cut was started. Upon striking the other trip dog 200 at the end of this high speed return stroke, the machine is reversed; the high speed clutch magnet 169 is deenergized; the jaw clutch spool 160 is returned to the slow speed side by its spring 168; the interlock switch 170 returns to its normal position; and the cutter head 112 travels "in", to a point where the tracer point 116 will again contact with the model, after which the machine will again take an automatically controlled cut across the work.

The control of this machine is entirely electrical, and in order that the following explanation of the electrical mechanism and circuits may be understood, a general description of principles and operations is desirable.

The circuits, as shown in Fig. 24, may be divided into two classes; "control circuits", and "operating circuits".

The term "control circuits" is understood to include all low potential, direct current circuits (12 to 15 volts).

These "control circuits" operate through all the relay magnet coils, except the series brake relay 142A. The "control circuits" also include all of the tracer circuits, except circuit 32—31 on the automatic tracer 265, (Fig. 24). Likewise, the circuits through the feed contactors 179 and 218; manual control switches 267 (Fig. 24) such as S1, S2, C1, 51—B of switch C2, circuit 35—36 of depth limit switch 308; and circuits 52 to ground and 33—51 of the high speed interlock 170—171, also comes under this head.

The term "operating circuits" is understood to include all circuits at standard lighting voltage (115 volts, direct current). These "operating circuits" operate through the armature circuits of all relays; through the circuit 32—31 of automatic tracer 265; through all magnetic clutches; through brake 142; clutch throw magnet 169, and coils 297 and 298 of reversing switch 301; and obviously, through all circuits not designated as "control circuits".

The current supply to the "control circuits" is shown at B, on control switch board, 267 (Fig. 24), as connected to one side of a battery or other source of low potential current, the other side of which is connected to ground at G.

In this connection it should be explained that the term "ground" is not used in the sense of a connection to the earth, but as a connection completing the circuit through the frame of the machine. Thus, all the conventionally shown grounded connections in Fig. 24, are connected to any convenient place on the machine. Therefore, it will be seen that, if the ground (G), at the source of the low potential "control circuits", is negative, and the switch C2 is closed, the circuit is completed by the connection of any wire, connected with wire 51, to any uninsulated part of the machine. In other words, under these conditions all non-insulated parts of the machine represent the negative side of the "control circuit".

The conditions just described are of extreme importance and, in order to make them more clear, one "control circuit" will be traced.

Close switch C2 (see Fig. 24). Also close switch S1, 52, to ground. The position of the control circuit, as previously indicated, is connected to wire 51, it will be seen, upon tracing wire 51, that it leads to one side of one coil of the double relay 290. Also, wire 51 goes to terminal 51 on control switch C1, and to 51 on high speed interlock 170, 171, which, as shown in Fig. 24, is normally closed. The circuit goes then to terminal 33 on interlock 170, 171, wire 33 will be seen to connect to one side of the other coil of the double relay 290, also to one side of the coil of relay 312.

Now follow the wire 52, which is connected to terminal 52 and to ground, upon closing the switch S1. This wire (52) goes to the terminal 52 on the high speed interlock 170—171, this circuit being normally open. It goes, also, to terminal 52 on tracer 265, thence to one side of the coil of double relay 290, which is the same coil to which the wire 51 is connected. Thus, it will be seen that the complete circuit is from source B to wire 51, thence to one relay coil on double relay 290, through this coil to wire 52, thence back through wire 52 to control switch S1 and to ground, the latter, as previously explained, represents the negative side of the source which is likewise grounded. Other circuits may be traced through in the same way.

The control board switches 267, which are preferably push button operated and located on the machine 266, Fig. 3, control, at the will of the operator, all movements of the machine. The arrangement of these switches, which are shown conventionally in Fig. 24, is as follows:—

Beginning at upper left corner; the first switch S1 is a momentary contact switch for manual control of transverse motion, toward or from the work. By momentary contact is meant that contact is maintained only while the switch is held closed, springs normally holding it open. The second switch S2, also controls the transverse motion, and determines whether the operation is to be through the momentary contact hand control switch S1 or automatic, under control of the tracer.

The third switch S3 is a momentary contact switch for manual control of vertical motion up or down. The fourth switch S4 controls the direction, that is up or down, of the vertical step by step feed. The fifth switch S5 controls the vertical motion, determining whether the operation is to be through the momentary contact switch for manual control (S3) or automatic, under the control of the tracer. The sixth switch S6 is a momentary contact switch for manual control of the horizontal motion, right or left. The seventh switch S7 controls the direction, that is right or left, of step by step feed, and also, the direction, right or left, of the operation of the quick return motion.

Eighth switch S8 controls the horizontal motion; determining whether the operation will be through manual control by the momentary contact switch S6 or automatic, under the control of the tracer.

The first switch C1 of lower group (267, Fig. 24) supplies the operating and control currents to the contour relays 335 and 336, when using the contour of profile tracer, to be described later. The second switch C2, lower group, controls the main supply of current to the entire mechanism for both control and operating circuits.

The third switch C3, lower group, controls the operating current for quick return motion and step by step feed horizontally.

The last switch C4 of the lower group is of the momentary contact type and is a short circuiting switch for the coils 297 and 298 of the reversing switch 296, and permits manually reversing horizontal or vertical automatic travel, dependent upon the position of the drum control switch, now to be described.

For simultaneously changing from one group to another of the various electrical circuits shown on the wiring diagram (Fig. 24) for automatic control of the machine under one or another of the several combinations of travel provided for, a drum-type switch is provided. A development of this drum switch and its connections is shown at 314, Fig. 24. It will be seen that in tracing circuits the contact fingers, represented in three vertical rows at 319, must be considered as being inter-connected or not by one or another of the rows of bars V, H and C at 314, which are on the drum, Figs. 22, 23. As shown in Fig. 24 the circuits are closed by the bars V for vertical operation; by the bars H for horizontal operation; and by the bars C for operation with the profiling or contouring tracer, which will be explained later. By referring to Figs. 21 to 23, it will be seen that the drum 314, which carries the bars V, H, C, comprises a cylinder, rotatably mounted in a frame 315, and is provided with a crank handle 316 for rotating it to different positions. One end of the drum frame 315 is provided with a dial plate 317, with which a pointer 318, projecting from the crank handle 316, cooperates, as will be seen in Fig. 21. The surface of the drum cylinder 314 is provided at each of three angular positions on its surface with three sets of contact bars, preferably 120° apart and designated as V, H and C, in the drum development of Fig. 24. These drum contact bars are adapted to cooperate with three sets of contact fingers 319, each insulated from the other and mounted on bars 320 forming part of the frame 315. The drum 314, at one end, is provided with a V-notched detent segment 321 (Figs. 22, 23), cooperating with a roller 322 on a detent lever 323 actuated by the spring 324, so as to retain the drum in set position. The dial 317 is provided with graduations at 325, corresponding with the V-notches of the detent segment 321 and the three notches are arranged to bring the respective series of contact bars V, H and C of each set, into engagement with the three sets of contact fingers 319, according to the corresponding designations "vert", "horiz" and "cont" on the dial. Between the finger contact positions are two "off" positions where the fingers 319 do not engage any series of bars on the drum 314. The three series of fingers 319 are represented in the wiring diagram, Fig. 24, by small squares, each numbered to correspond with the circuit carried thereby. To avoid confusion, the reference numerals and characters indicating the circuits and various parts and connections as given on the wiring diagram (Fig. 24) correspond to the shop designations and it is believed that those skilled in the art will have no trouble in tracing out and clearly understanding the various circuits and the operation of the machine.

By means of the drum switch (314—319) just described, the direction of operation of the machine may be altered to suit the work, for instance, when the drum 314 is set at "horiz" (Fig. 21, same as H, Fig. 24), the automatic travel of the machine for a cut across the work will be horizontal, alternately left and right on the bed; this motion being limited by the horizontal trip dogs 200 and horizontal reversing contactor 197. The step by step feed, in the case of horizontal operation, will be vertical (up or down) and under control of the vertical feed contactor 218.

By changing the position of the drum switch 314 to the point marked "vert", (Fig. 21, same as V, Fig. 24) the automatic travel of the machine will be alternately up and down, under the control of the vertical trip dogs 224, 225, and vertical reversing contactor 222, while the step by step feed will be from right to left or left to right, as desired, and under the control of the horizontal feed contactor 179, Figs. 10–12 and 24.

The operation of the machine, as thus far described, has comprised two compound motions, under the control of the tracer 265, and a third motion, or step by step feed, under control of a feed contactor 179 (24) or 218 (22). Under horizontal operating conditions, (drum switch set so that the three series of bars H (Fig. 24) engage the three rows of contact fingers 319), the main or horizontal slide motion is compounded with the transverse or in and out motion of the transverse slide 112 by means of the tracer 265. The third, or vertical step by step feed motion, is under the control of vertical feed contactor mechanism 218 (22), which advances the vertical slide step by step the desired amount, thus covering a three dimension surface.

Under vertical operation, (the drum switch turned so that bars V engage contact fingers 319), the vertical motion is compounded with the transverse in and out motion, while the longitudinal motion of the column slide 105 is operated through the horizontal feed contactor 179 (24) for the step by step feed, in order to cover a three dimension surface.

There is one other condition of operation provided for, which has been denoted a contouring or profiling operation. In this method of operation, the horizontal and vertical motions are automatically compounded under the control of a special tracer head which permits the machine to follow a template mounted in a plane parallel to the directions of motion of the horizontal and vertical slides. This special tracer is referred to as a contouring tracer and, when used, is mounted on the tracer supporting bracket 115 on the transverse slide 112 in place of the tracer 265, previously described. This contouring tracer is semi-automatic, and its operation is under the guidance of the machine operator. The contouring tracer is ordinarily used for two dimension profiling, but if this method of operation is to be carried out on a three dimension surface, the step by step feed is effected by the movement of the transverse or cutter head slide 112, by hand operation of the proper push button switch (S1, Fig. 24), so that the operation becomes a succession of profiling cuts which, when completed, form a surface of contour lines, and effectually cover the three dimension surface.

The contouring tracer 326 (Figs. 25 to 27) is provided with a rotating head 327, upon which two contact carrying arms 328 are pivoted, at right angles to each other, and each carries two contacts 329, 330, cooperating with contacts 331, 332, on the rotating head 327. The rotating head 327 carries on its periphery four commutator segments 334, spaced 90° apart. These segments cooperate with four brushes 333, also spaced 90° apart around the tracer casting 326.

The two contacts 331 are directly connected electrically to two of the segments 334. The two contacts 332 are connected to the two remaining segments through the coils of the interlock relays 144. It will be seen that the four sets of contacts on the rotating head are adapted, through the four brushes 333 operating on commutator segments 334, to control the circuits through two double relays 335, 336 (see Fig. 24) which in their turn control four magnetic clutches, two 130, 131, in the horizontal clutch case 134 and two, 217, in the vertical clutch case 215, Figs. 1 and 5. The contact carrying arms 328, on one end, carry the contacts 329, closing on 331, normally held closed by springs 327. These will be designated as front contacts and are adapted to control, through the relays 335, 336, the direct or so-called leading motions. At the opposite ends of the levers 328 are the contacts 330, closing on 332, which, as shown in Fig. 25, are normally open. These will be designated back contacts and are adapted to control, through the relays 335 and 336, the reverse of the leading motions.

It is to be understood that if one of the contact arms 328, by its front contact 329 on 331, controls horizontal motion to the right, the contact 330 on 332, at the opposite end of that arm, will control horizontal motion to the left. At the same time the other arm 328, through its front contact 329 on 331, will control vertical motion upward, while the contact 330, on 332, on the opposite end of this arm, will control vertical motion downward.

The contact carrying arms 328 are engaged by a button 338 on the end of the tracer spindle 339, corresponding to the tracer spindle 268 of Fig. 16 and mounted on a similar ball joint 340, 341, permitting universal lateral movement, longitudinal movement not being required. It will thus be seen that lateral pressure on the tracer point 116 will cause the button 338 to lift one or both of the contact carrying arms 328, thereby opening the front contacts 329, 331 and stopping one or both of the leading motions. A hand operated pointer 342, moving over a dial 343, is geared, as shown in Fig. 27, for rotating the contact carrying head 327 to different points NW, NE, etc. (Fig. 25), according to the direction of motion required. Since the closed front contacts 329, 331 on one arm control the horizontal leading motion and on the other arm, the vertical leading motion, the machine, when the tracer point 116 is free of the model, will operate in two directions at the same time; for instance, up and to the right, NE; or down and to the right, SE; or down and to the left SW; or up and to the left, NW; according to the position of the rotatable head 327. This gives us four compound motions, which will carry the tracer completely around a circle.

In order to make the operation of the two compounded motions in the contouring tracer perfectly safe, there is, mounted on the tracer head, a pair of interlock magnets or relays 344. The operation of these interlock magnets or relays is such that when one of the reversing or back contacts 330 on a contact arm 328 is closed, and the motion of the machine controlled by that arm, reversed, the associated magnet or relay 344, through the connecting wires 345 becomes energized and automatically locks out the motion at right angles to the motion reversed, by means of the armature lever 346, until the first motion shall have had time to operate and open the back contacts 330, 332. When this occurs, the relay is deenergized and the interlock removed, thereby permitting the other motion, controlled by the front contact 329, to continue.

It will be understood that the great value and importance of my improved interlock contouring tracer lies in the utility of the device for operating upon models or templates of extremely complicated contour or profile, as well as upon those of simple profile. In order to illustrate the operation in connection with work requiring complicated movements, attention is called to the diagram in Fig. 28 of the drawings, where the steps of movement of the contouring tracer are shown enlarged many times. This illustration of the operation is more particularly adapted to show the action of the contouring tracer interlock mechanism and how the tracer will work itself around a portion of a circle, representing the model or template. For instance, in Fig. 28, assume that the pointer 342 is in the position illustrated in Fig. 25 and the contact carrying head and contact carrying arms are in the position there shown. In this position the direction of motion will be up and toward the left, or northwest. The tracer (represented by the small circles) will then moved from position (1) to position (2), at an angle of 45°, on the assumption that the motions are equal in both directions. As soon as the tracer strikes the model at (2) the north or up motion will stop. Then the west motion will be interrupted and the arm 328, controlling the west motion will be thrown over far enough to close the back contacts 330, 332 for the reverse or east motion and the tracer will be moved to (3). When the relay circuit through the back contact 330, 332 and the relay 335—E is operating, it will be understood that the interlock magnet 344 is energized and, through the armature arm 346, will positively break the contact of the north motion.

As soon as the tracer moves east to the point (3) the east or reverse contact 330, 332 will be broken and the north contact 329, 331 of the arms 328 will be closed. The tracer will then move to position (4). Here the operation will be again repeated, that is, closing the east contact and breaking the north contact, and the tracer will move out to position (5). This operation will be repeated exceedingly rapidly while following up the curve of the model to the point (6). Here it will be seen that the contact, controlling the west motion through the relay 335—W, will be broken and the motion will be north or up to the point (7). As soon, however, as the tracer moves away from the contour of the model far enough to permit contacts 329—331 of the arm 328 to operate, the west relay 336—W will again energize the magnetic clutch for the west motion and the movement will be northwest to the point (8). Here again the west motion will be broken and the motion will be north, and this will be repeated until the tracer arrives at the point (A), at which point, it will be seen that the northwest direction of motion is tangent to the curve of the model, and the tracer will pass off the contour. It is then necessary to rotate the pointer 242 to the next index post SW.

It will be understood that the rate of travel in the two rectilinear directions should be the same for the best results, and it is found in practice that a travel of two (2) inches per minute gives satisfactory results and, preferably, the travel should not exceed 2 and 3/4 inches per minute. It will also be understood that when following a curve, on the model or template, the circuits are interrupted by breaking the contacts momentarily, so that, while the movements, represented in magnified form in Fig. 28 of the drawings, produce a saw-tooth edge, the interruptions are so rapid and the amount of movement, prior to the interruptions, is so small, that the teeth formed are really microscopic. Therefore, the resultant profile cut on the work is a substantially accurate reproduction of the curve of the model or template.

When the contouring tracer is to be used, the drum switch 314 is turned to contour position (cont. Fig. 21 and C, Fig. 24), as previously explained, and the necessary relays, switches and circuits, controlling the horizontal and vertical magnetic clutches, will be brought into operative control of the contouring tracer 326, so that, as the rotating head 327 is rotated by the operator, the tracer point 116 (Fig. 27) will follow the template.

While I have shown my improved electrically operated machine in the preferred form, it will be understood that for special machines, and in adapting the tracers or other devices to various types of work, numerous modifications in the specific details of construction, and in the control circuits may be required, and therefore, I do not wish to be limited in the interpretation of the claims to the specific details shown, for various modifications may be made therein without departing from the spirit and scope of the invention, as expressed by the scope of the claims.

I claim:—

1. In a machine of the character described, the combination with a slide and lead screw for moving the same, of motor driven magnetic clutches for operating said screw for motion in either direction, dogs for limiting said motion, a reversing contactor adapted to be actuated by said dogs and a reversing switch actuated by said contactor for reversing the operation by said magnetic clutches, thereby reversing the drive of the screw.

2. The machine as claimed in claim 1, in which said reversing contactor is provided with means for breaking the circuits of said magnetic clutches, and thereby stop the motion, to prevent overrun of the slide.

3. The machine as claimed in claim 1, in which intermediate slow and high speed gear trains are interposed between said magnetic clutches and the screw and an electromagnet is provided for changing from slow to high speed, said magnet being controlled by said reversing contactor.

4. In a machine of the character described, the combination with a slide and a lead screw for moving the same, of a pair of motor driven magnetic clutches for operating said screw in either direction, a reversing switch for closing the circuit through one magnetic clutch or the other for operating said screw, and a reversing contactor adapted to be actuated by said slide for reversing said reversing switch and thereby reversing the motion of said slide.

5. The machine as claimed in claim 4, in which adjustable dogs are provided for actuating said reversing contactor for limiting the motion of the slide in each direction, said contactor being adapted when actuated by said dogs, to close circuits for reversing said reversing switch.

6. The machine as claimed in claim 4, in which there is associated with the means for reversing said reversing switch, means for breaking the circuits through the respective magnetic clutches upon excessive travel of the slide to stop the motion and prevent over-run of the slide.

7. The machine as claimed in claim 4, in which the slide controlled by said reversing switch carries a transverse slide movable toward and from the work, and an electric tracer, cooperating with a pattern, is mounted thereon for controlling the movements of said transverse slide toward and from the work.

8. In a machine of the character described, the combination with horizontal and vertical slides operated by lead screws, of motor driven magnetic clutches for operating the respective lead screws in either direction of motion, a reversing switch for closing the circuits through said magnetic clutches, reversing contactors associated with the respective slides and adapted to be operated thereby, during continuous travel operation, to reverse the motion, and means for limiting continuous travel operation and control to one of said slides, that is, either the horizontal or vertical.

9. The machine as claimed in claim 8, in which horizontal and vertical feed contactors are provided for each lead screw for controlling step by step feed of the respective slides and means is provided whereby said reversing switch is adapted to place said feed contactors in operation.

10. The machine as claimed in claim 8, in which means is provided for controlling the energization of the magnetic clutches of the respective horizontal and vertical lead screws for continuous travel or step by step feed of the slides, said controlling means being adapted to be placed in operation by said reversing switch.

11. The machine as claimed in claim 8, in which feed contactors are provided for controlling the energization of the respective horizontal and vertical magnetic clutches for step by step feed of the slides, and said continuous travel limiting means is so arranged that when one slide is under continuous travel operation, controlled by its reversing contactor, the other slide will be under step by step feed operation, controlled by its feed contactor.

12. In a machine of the character described, the combination with a slide and a lead screw for moving the same, of a pair of motor driven magnetic clutches for operating said screw in either direction, electric circuits for energizing said clutch magnets, an electromagnetic brake for stopping motion of said screw, comprising a clutch magnet similar to the magnetic clutches for driving the lead screw, and a relay, in the circuit of the magnetic clutches, adapted to control said brake magnet in such a manner that when the magnetic clutches are energized the brake magnet will be deenergized and vice versa.

13. In a machine of the character described, the combination with a slide and a lead screw for moving the same, of a pair of motor driven magnetic clutches for operating said screw in either direction, electric circuits for energizing said clutch magnets, an electromagnetic brake for stopping motion of said screw, means for energizing said magnetic clutches one at a time for continuous travel in one direction or the other and means controlled by said slide for reversing the motion by effecting the energization of the other magnetic clutch, said brake magnet being energized when the first clutch is deenergized and deenergized when the other clutch is energized.

14. In a machine of the character described, the combination with horizontal, vertical and transverse slides, of electrically controlled motor driven magnetic clutches for operating the lead screws for the respective slides, for direct and reverse motions thereof, a single reversing switch for controlling, through the respective horizontal and vertical magnetic clutches, the motions of the horizontal and vertical slides and an electric tracer mounted on and adapted, through the transverse magnetic clutches, to control the motion of said transverse slide as the tracer follows the pattern.

15. The machine as claimed in claim 14 in which a drum switch is provided for determining continuous travel for either the horizontal or vertical slide and said electric tracer is provided with contacts which when interrupted will stop said continuous travel, said contacts being adapted to be interrupted by contact of the tracer with the pattern, under certain conditions of operation.

16. The machine as claimed in claim 14, in which limit switches, adapted to be operated by said transverse slide, are provided for breaking the respective circuits of the transverse lead screw magnetic clutches for limiting the in and out movement of the cutter and tracer.

17. In a machine of the character described, the combination with horizontal, vertical and transverse slides, of electrically controlled motor driven magnetic clutches for operating the lead screws of the respective slides for direct and reverse motions thereof, a depth limit switch mounted for cooperation with said transverse slide, adapted to break the circuit of the corresponding magnetic clutch and stop the in movement, and adjustable means for determining the position at which the in movement limit switch shall be operated.

18. The machine as claimed in claim 17, in which an out limit switch is provided, adapted for cooperation with adjustable means on said transverse slide for limiting the outward movement of said slide.

19. The machine as claimed in claim 17, in which there is associated with the in limit switch, an interlock switch, which is adapted to permit operation of the horizontal slide when the in limit switch is operated to stop the in movement of said transverse slide.

20. In a machine of the character described, the combination with horizontal, vertical and transverse slides, of electrically controlled motor driven magnetic clutches for operating the lead screws for the respective slides for direct and reverse motions thereof, an out limit switch mounted for cooperation with said transverse slide and adapted for stopping out movement thereof, and adjustable means for determining the position at which said out limit switch shall be operated.

21. The machine as claimed in claim 20, in which there is associated with said out limit switch of the transverse slide, an electrical interlock switch adapted to prevent continuous travel operation of one of the other of said slides until the out limit switch is actuated to stop the movement of said transverse slide.

22. The machine as claimed in claim 20, in which the horizontal slide lead screw is provided with slow and high speed gearing connections for varying the motion and means is provided for changing the motion from slow to high speed, there being associated with said means an interlock switch cooperating with an interlock switch associated with said limit switch of the transverse slide, whereby when the motion is changed to high speed, the horizontal slide will be prevented from high speed return movement until said out limit switch is operated.

23. In a machine of the character described, the combination with horizontal and vertical slides, operated by lead screws, of motor driven magnetic clutches for operating the respective lead screws in either direction of motion, a feed contactor for controlling step by step feed, associated with each lead screw and adapted to be operated thereby, and means whereby the feed contactor of one lead screw is adapted to be placed in operation by the slide of the other lead screw.

24. The machine as claimed in claim 23, in which each of said feed contactors comprises a plurality of rotatable cam toothed discs, each with a different number of teeth thereon, said toothed discs cooperating respectively with contact levers controlling the feed circuit and means is provided for selecting one or another of said discs and contact levers for controlling the step by step feed of the corresponding slide.

25. The machine as claimed in claim 23, in which a drum switch is provided for placing in operation one or the other of said feed contactors, the arrangement being such that only one feed contactor can be in operation at a time.

26. The machine as claimed in claim 23, in which each of said feed contactors is geared to the lead screw drive through a plurality of intermediate gears and a slidable change gear is provided for changing the speed of rotation of the feed contactor relative to the lead screw.

27. In a machine of the character described, the combination with horizontal and vertical slides, operated by lead screws, of motor driven magnetic clutches for operating the respective lead screws in either direction of motion, electrically operated means for controlling direct and reverse continuous travel of the respective slides, electrically operated means for controlling step by step feed of said slides, and a drum switch adapted to be turned to one position for continuous travel of the horizontal slide and step by step travel of the vertical slide and to another position for continuous feed of the vertical slide and the step by step feed of the horizontal, the arrangement being such that the slides can have but one type of movement at a time.

28. The machine as claimed in claim 27, in which a manually operated push button switch is provided for stopping or placing the respective continuous travel and step by step feed of said slides in operation independently of said drum switch.

29. The machine as claimed in claim 27, in which a reversing switch is provided for controlling the reciprocating continuous travel of said slides under the control of dog actuated reversing contactors associated with the respective slides, and a manually operated push button switch is provided for operating said reversing switch independently of said reversing contactors.

30. The machine as claimed in claim 27, in which the horizontal slide lead screw is provided with two lines of intermediate gears between the lead screw and the magnetic clutches for driving the same, one line of gears being for high speed operation of the lead screw and the other for slow speed operation, the slow speed line of gears being provided with change gears for changing the ratio therebetween to thereby vary the slow speed operation of the screw.

31. The machine as claimed in claim 27, in which two lines of intermediate gears are provided between the magnetic clutches and the lead screw of the horizontal slide, one line being for slow speed and the other for high speed, electromagnetic means, under the control of said means controlling the motion of the horizontal slide, being provided for changing the operation from slow to high speed, at the time the direction of motion is reversed, and a manually operated switch for placing said electromagnetic high speed means in operation.

32. In a machine of the character described, the combination with horizontal and vertical slides, operated by lead screws, of motor driven magnetic clutches for operating the respective lead screws in either direction of motion, a pair of double relays adapted for controlling, through the respective magnetic clutches, direct and reverse motion of said horizontal and vertical slides.

33. The machine as claimed in claim 32, in which a contouring tracer, carried by and movable horizontally and vertically by said slides, is adapted to control the movement thereof by actuating the respective magnets of said relays.

34. The machine as claimed in claim 32, in which each of said relays is provided with an electromagnet for direct and for reverse motion of the respective slides, and each of said magnets is connected to a different quadrant of a contouring tracer, mounted for movement horizontally and vertically by said slides, and said contouring tracer is provided with a corresponding number of contacts for closing the circuits through the respective magnets and thereby controlling the motion of said slides.

35. The machine as claimed in claim 32, in which the magnets of said double relays for direct and reverse motion of the respective slides are connected by lead wires to four radially disposed brushes, 90° apart around the head of a contouring tracer mounted for movement horizontally and vertically by said slides, said tracer being provided with a rotatable head having commutator segments for cooperation respectively with each of said brushes, and a pair of contact carrying arms mounted upon said head, at right angles to each other, each carrying two contacts, one for direct and the other for reverse motion of the respective slides when the contacts are closed to complete the circuits through the respective relay magnets.

36. In a machine of the character described, the combination with horizontal and vertical slides, operated by lead screws, of motor driven magnetic clutches for operating the respective lead screws for movement horizontally and vertically by said slides, a double relay for controlling direct and reverse motion of each of said slides, leads connecting the magnets of each relay to brushes located in diametrically opposite quadrants around said contouring tracer, a rotatable head provided with commutator segments in each quadrant for cooperation with said brushes, a pair of contact carrying arms at right angles to each other, pivotally mounted upon said head, each arm carrying two contacts for closing the circuits through the respective relay magnets, the circuits, by closing said contacts, being completed for direct and reverse motions through diametrically opposite brushes and a tracer spindle for actuating said contact carrying arms.

37. The machine as claimed in claim 36, in which an interlock relay, carried by said tracer head, is included in the reverse motion circuit of each of said contact carrying arms and each is adapted to be placed in operation by closing the corresponding reverse motion contact, said relay for one arm being adapted to break the direct motion circuit of the other arm.

38. The machine as claimed in claim 36, in which means is provided for rotating the rotatable head of said tracer and a pointer associated therewith is adapted to indicate the resultant direction of movement.

39. The machine as claimed in claim 36, in which a switch is provided for placing said double relays in circuit with the respective magnetic clutches for operating the horizontal and vertical slides for direct and reverse motion thereof.

JOHN C. SHAW.